US009311144B1

(12) United States Patent
Krishnamoorthy

(10) Patent No.: US 9,311,144 B1
(45) Date of Patent: Apr. 12, 2016

(54) PROCESSING VIRTUAL TRANSACTIONS OF A WORKFLOW IN ATOMIC MANNER IN A WORKFLOW MANAGEMENT COMPUTER SYSTEM

(71) Applicant: XACTLY CORPORATION, San Jose, CA (US)

(72) Inventor: Vasudev Krishnamoorthy, San Jose, CA (US)

(73) Assignee: XACTLY CORPORATION, San Jose, CA (US)

( * ) Notice: Subject to any disclaimer, the term of this patent is extended or adjusted under 35 U.S.C. 154(b) by 0 days.

(21) Appl. No.: 14/707,969

(22) Filed: May 8, 2015

(51) Int. Cl.
*G06F 9/46* (2006.01)
*G06F 9/48* (2006.01)
*G06F 17/30* (2006.01)
*G06F 9/50* (2006.01)

(52) U.S. Cl.
CPC ........ *G06F 9/4881* (2013.01); *G06F 17/30011* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 2002/0062337 | A1* | 5/2002 | Minow | 709/203 |
| 2004/0187127 | A1* | 9/2004 | Gondi | G06F 9/466 718/100 |
| 2006/0074736 | A1* | 4/2006 | Shukla | G06Q 10/06 717/100 |
| 2006/0080394 | A1* | 4/2006 | Goodman | H04L 63/101 709/206 |
| 2007/0174113 | A1* | 7/2007 | Rowen | 705/14 |
| 2008/0114791 | A1* | 5/2008 | Takatsu et al. | 707/100 |
| 2010/0125477 | A1* | 5/2010 | Mousseau et al. | 705/7 |
| 2010/0146385 | A1* | 6/2010 | Goulandris | G06Q 10/08 711/255 |
| 2010/0281462 | A1* | 11/2010 | Festa | 717/108 |
| 2012/0331150 | A1* | 12/2012 | Rao | G06F 9/5038 709/226 |
| 2013/0179400 | A1* | 7/2013 | Daly et al. | 707/631 |
| 2013/0218829 | A1* | 8/2013 | Martinez | G06F 21/6272 707/608 |
| 2013/0332210 | A1* | 12/2013 | Wyganowski | G06Q 30/04 705/7.13 |
| 2014/0108917 | A1* | 4/2014 | Style | G06F 17/30492 715/234 |

* cited by examiner

*Primary Examiner* — Eric C Wai
*Assistant Examiner* — James J Lee
(74) *Attorney, Agent, or Firm* — Hickman Palermo Becker Bingham LLP

(57) ABSTRACT

A data processing method comprising the computer-implemented steps of using a process management computer, receiving an electronic workflow document in response to execution of editing instructions at a user terminal that is coupled by network to the process management computer, wherein the electronic workflow document defines a workflow using a plurality of tags and statements that specify steps in the workflow, wherein each of the steps is either an atomic type step or a non-atomic type step, wherein at least a first step that is atomic comprises a plurality of instructions and is programmed to signal, to a second and successive non-atomic step, normal completion of execution of the first step; wherein at least a second step that is non-atomic is programmed to call a completion callback in response to the signal; using the process management computer, parsing the electronic workflow document to form an in-memory representation of the workflow in computer memory; using the process management computer and using the in-memory representation, executing the first step, transitioning to the second step and executing at least a portion of the instructions that are programmed in the second step; using the process management computer, receiving a completion callback signal from the second step in response to normal completion of execution of the first step; using the process management computer, and only after receiving the completion callback signal from the second step, continuing execution of other instructions that are programmed in the second step.

21 Claims, 6 Drawing Sheets

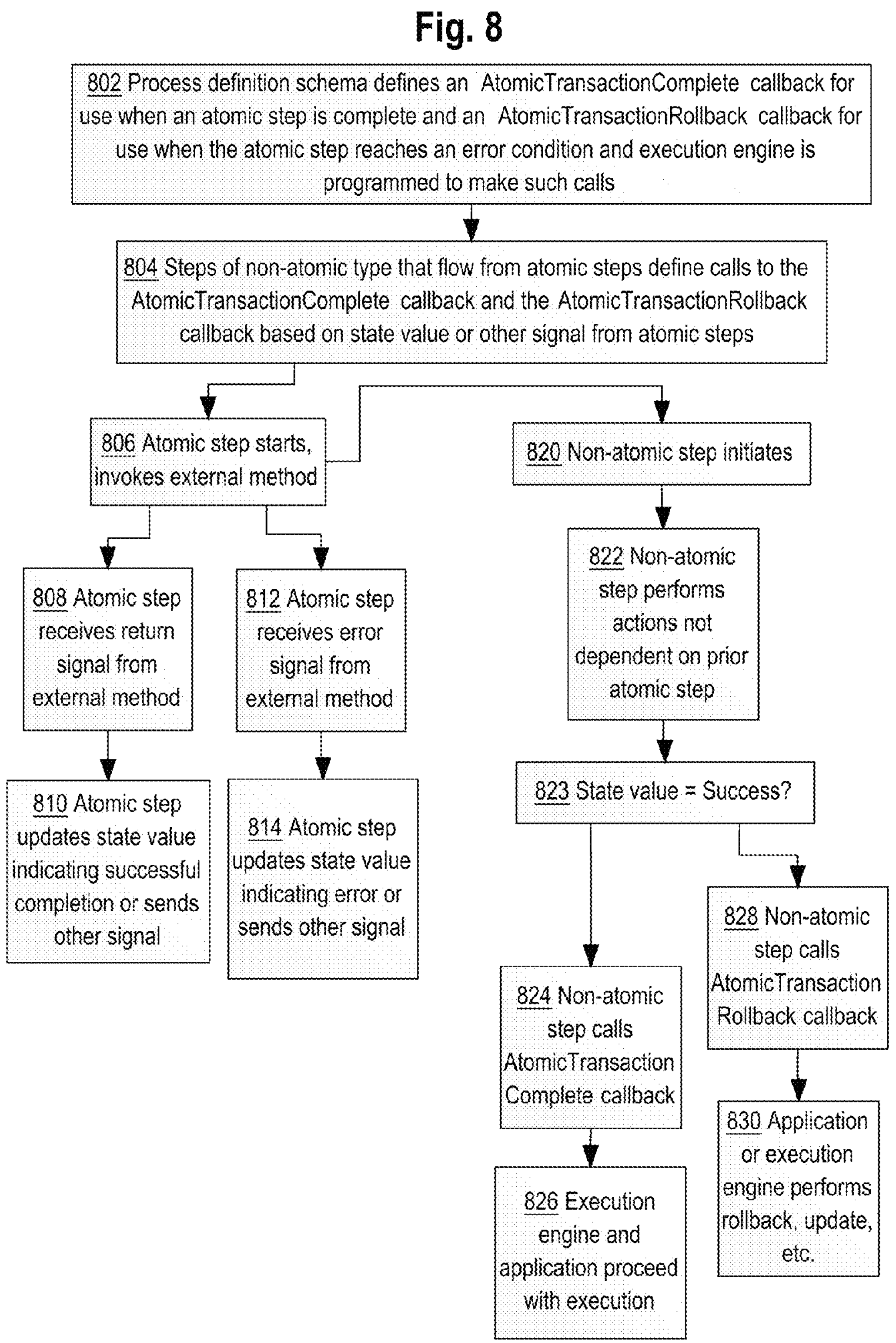
Fig. 8
802 Process definition schema defines an AtomicTransactionComplete callback for use when an atomic step is complete and an AtomicTransactionRollback callback for use when the atomic step reaches an error condition and execution engine is programmed to make such calls
804 Steps of non-atomic type that flow from atomic steps define calls to the AtomicTransactionComplete callback and the AtomicTransactionRollback callback based on state value or other signal from atomic steps
806 Atomic step starts, invokes external method
820 Non-atomic step initiates
808 Atomic step receives return signal from external method
812 Atomic step receives error signal from external method
822 Non-atomic step performs actions not dependent on prior atomic step
810 Atomic step updates state value indicating successful completion or sends other signal
814 Atomic step updates state value indicating error or sends other signal
823 State value = Success?
828 Non-atomic step calls AtomicTransaction Rollback callback
824 Non-atomic step calls AtomicTransaction Complete callback
830 Application or execution engine performs rollback, update, etc.
826 Execution engine and application proceed with execution

PROCESSING VIRTUAL TRANSACTIONS OF A WORKFLOW IN ATOMIC MANNER IN A WORKFLOW MANAGEMENT COMPUTER SYSTEM

FIELD OF THE DISCLOSURE

The present invention relates to computers and computer systems that are configured or programmed to execute workflow management functions in relation to multi-tenant database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional software development models continue to cause problems for enterprises in the business of creating, licensing and supporting software. The end results are often not flexible enough to keep pace with the ever changing requirements of the business customer. What starts out as a clearly defined implementation often becomes quite a convoluted solution. Even if the overall flow of an application initially is clearly defined, the resulting solution often ends up blurring this flow with unrelated issues such as the user interface and back-end systems integration.

When technologies such as Java Server Pages (JSPs) first arrived they were hailed as a breakthrough to permit one to design and implement web based applications where the user interface was quick and easy to maintain. Unfortunately these systems proved to be not so wonderful on their own. While they were easy and quick to develop, people still blurred the user interface with the actual application decisions and "flow" of the back-end data processing. Consequently, professional developers now generally adhere to a three-tier development model that separates the user interface, control model or process, and back-end systems or services. In this approach, the user interface may be implemented with any of several systems such as JSPs, XSL-stylesheets, Visual Basic, Javascript and the like. This approach also allows the user interface to decide how to present the information to the user using WAP, HTML, or other technology depending on how the user is accessing the system.

The back-end systems or services store data using any of databases, legacy applications, or CRM systems. The Control Model (or Process) Layer ties together the data and user interface, comprising processing logic to determine what step must be performed next, what data must be presented to the user next, what back-end database, or application, needs to be updated as a result of the previous user interaction, and so forth. A layered approach that involves a mix of appropriate user interface and database systems cannot succeed unless the Control Model (Process) Layer is effective. The layered approach also permits developers to spend less time on the user interface or data systems and more time on the developing the controlling process. It will be apparent that good process support technology is necessary to the success of a layered project.

Automated workflow management is a branch of computer science that deals with computer-executed programs that manage technical and business processes. For example, various kinds of business-to-business interactions, such as between suppliers and buyers or partners, can be managed in this manner. A process, in this context, is a series of tasks that achieve a common purpose; each task is performed by a person or a software application. Typically work is automatically sent to a recipient; work directed to individuals may flow using web pages, e-mail messages, or notifications within a software application, and work directed to applications may flow through an integration system. Processes can involve tasks for multiple different departments of an enterprise, or multiple different companies or enterprises, for example, customers and their suppliers. Processes typically include one or more tasks that require review or approval, and complex approval chains may be reflected in a workflow. Arranging tasks as processes with computer program support enables automated orchestration of complex series of tasks across many different work units in an enterprise. Both individuals and applications can be involved, and computers involved in the system can be programmed to handle errors, cancellation, and roll-back of tasks, applications or data. The computers also can provide monitoring and tracking, and can be arranged in an infrastructure that can be replicated to provide added capacity. These systems can be programmed to permit rapid changes in the definition of processes, so they can adapt to changes in underlying business structures or agreements.

SUMMARY

The appended claims may serve as a summary of the invention.

BRIEF DESCRIPTION OF THE DRAWINGS

In the drawings:

FIG. 8 illustrates a process of implementing virtual transactions in a workflow management system using an AtomicTransactionComplete callback and an AtomicTransactionRollback callback.

DETAILED DESCRIPTION

Figure 1:
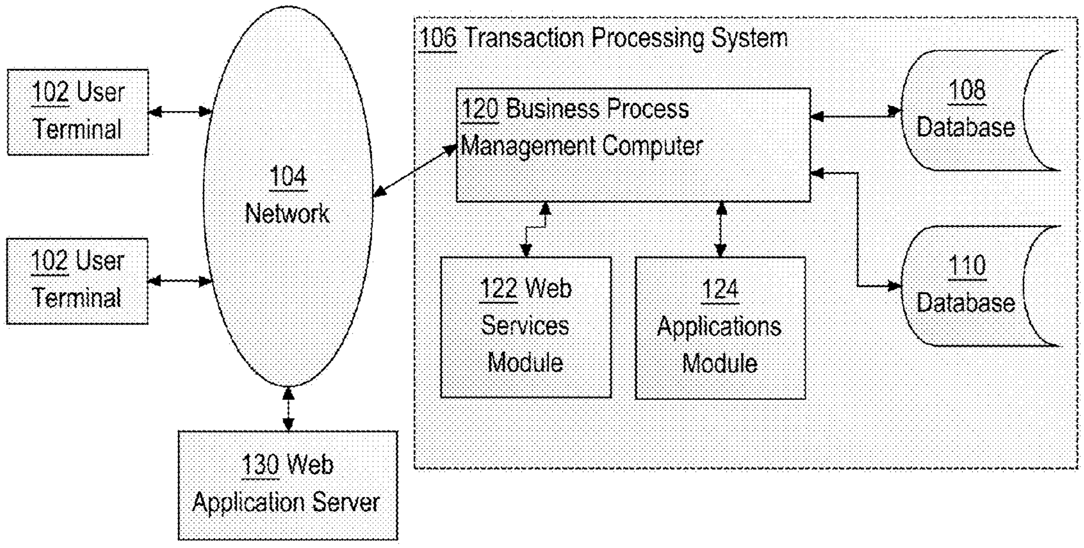
FIG. 1 illustrates a computer system that includes one embodiment of functional logic that is configured to perform the techniques described herein.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The appended TABLE A is an example process definition schema that may be used to define processes; TABLE B is an example service API that the process management engine 108 may be programmed to implement; TABLE C is an example definition of a process according to the schema of TABLE A. The tables form part of the disclosure.

Embodiments are described according to the following outline:

1. GENERAL OVERVIEW
2. STRUCTURAL OVERVIEW
3. FUNCTIONAL OVERVIEW—PROCESS MODEL
4. "AtomicTransactionComplete" Callback AT QUIESCENT STATE; "AtomicTransactionRollback" Callback" ON ERROR CONDITION
5. IMPLEMENTATION EXAMPLE—HARDWARE OVERVIEW
6. TABLES

GENERAL OVERVIEW

In an embodiment, a data processing method comprises, using a process management computer, receiving an electronic workflow document in response to editing instructions of a user terminal, wherein the electronic workflow document defines a workflow using a plurality of tags and statements that specify steps in the workflow, wherein each of the steps is either an atomic type step or a non-atomic type step, wherein a series of atomic steps is executed transitioning to a non-atomic step, such as an Event Step, Performer Step, or Timer Step, allowing the process engine to call AtomicTransactionComplete callback signaling the successful completion of the preceding atomic steps For example, a series of atomic steps may call one or more web services using a Service Step to update a database, or JAVA methods called from Execution Steps, which can update the application database that is orchestrated by the process orchestration engine. In embodiment the method further comprises, using the process management computer, parsing the electronic workflow document to form an in-memory representation of the workflow in computer memory; using the process management computer, executing the series of atomic steps, transitioning to the non atomic step; using the process management computer calling the AtomicTransactionComplete to signal normal completion of preceding atomic step or steps; wherein the method is performed by one or more special-purpose computing devices.

In another aspect, the disclosure provides a data processing method comprising the computer-implemented steps of, using a process management computer, receiving an electronic workflow document in response to editing instructions of a user terminal, wherein the electronic workflow document defines a workflow using a plurality of tags and statements that specify steps in the workflow, wherein, a series of atomic steps is executed transitioning to a non-atomic step such as an Event Step, Performer Step, or Timer Step, allowing the process engine to call an AtomicTransactionRollback callback, in response to occurrence of an error during execution of the preceding atomic steps due to errors thrown by calling external web services or library methods and the callback can take necessary steps to undo their work and update their datastore appropriately.

STRUCTURAL OVERVIEW

FIG. 1 illustrates a computer system that includes one embodiment of functional logic that is configured to perform the techniques described herein. One or more user terminals 102 are communicatively coupled to a network 104 that is further coupled to a transaction processing system and a web application server 130. Each of the user terminals 102 typically comprises a desktop computer, workstation, laptop computer, or mobile device that hosts or executes an HTTP browser application program. For purposes of illustrating a clear example, two (2) user terminals 102 are shown but other embodiments may use any number of user terminals.

Network 104 broadly represents one or more local area networks, wide area networks, internetworks or a combination thereof. Web application server 130 represents a computer or computing instance that is configured or programmed to provide a service to the transaction processing system 106 in response to calls that conform to Web Services protocols, as further described herein. For purposes of illustrating a clear example, a single web application server 130 is shown but other embodiments may use any number of web application servers.

In an embodiment, transaction processing system 106 comprises one or more computers, clusters, processors, processor cores, or virtual machine instances executed using local computing hardware and/or virtual computing infrastructure. Transaction processing system 106 is configured or programmed with a business process management computer 120, web services module 122, and applications module 124; the business process management computer is coupled to one or more databases 108, 110. In one embodiment, transaction processing system 106 implements a highly-available, multitenant shared database system that is capable of high-speed execution of transactions for a large number of tenants, clients or customers. Data relating to tenants, such as application-specific records, may be stored in the databases 108, 110, which also may store data supporting the operation of the BPM computer 120. Alternatively, storage separate from the databases 108, 110 in one or more other storage devices or instances may be used to store the supporting data. Further, the business process management computer 120 may maintain one of the databases solely to support the execution engine and may permit an application to use and manage the other database.

In general, the web services module 122 is configured or programmed to communicate using Web Services calls with web application server 130 in response to requests or commands from business process management computer 120. In general, the applications module 124 is configured or programmed to implement local specific application functions. In one specific embodiment, the applications module is programmed to implement a management system for incentive compensation plans and related users or employees; the XACTLY INCENT system commercially available from Xactly Corporation, San Jose, Calif. are examples of applications that can be programmed as part of applications module 124. In such an embodiment, databases 108, 110 may correspond to a Q&T database and an INCENT database, respectively.

In general, the business process management computer 120 is configured or programmed to provide workflow management services and functions as further described herein. In one embodiment, the BPM computer 120 is programmed to interact with the user terminals 102 to rapidly define or create logical definitions of processes and related workflow solutions, which may be represented in metadata or configuration information stored in the databases 108, 110 or other data storage. In one embodiment, the BPM computer 120 is programmed to allow the flexible, controlled integration and cooperation between individuals and business applications to meet enterprise objectives.

Figure 5:
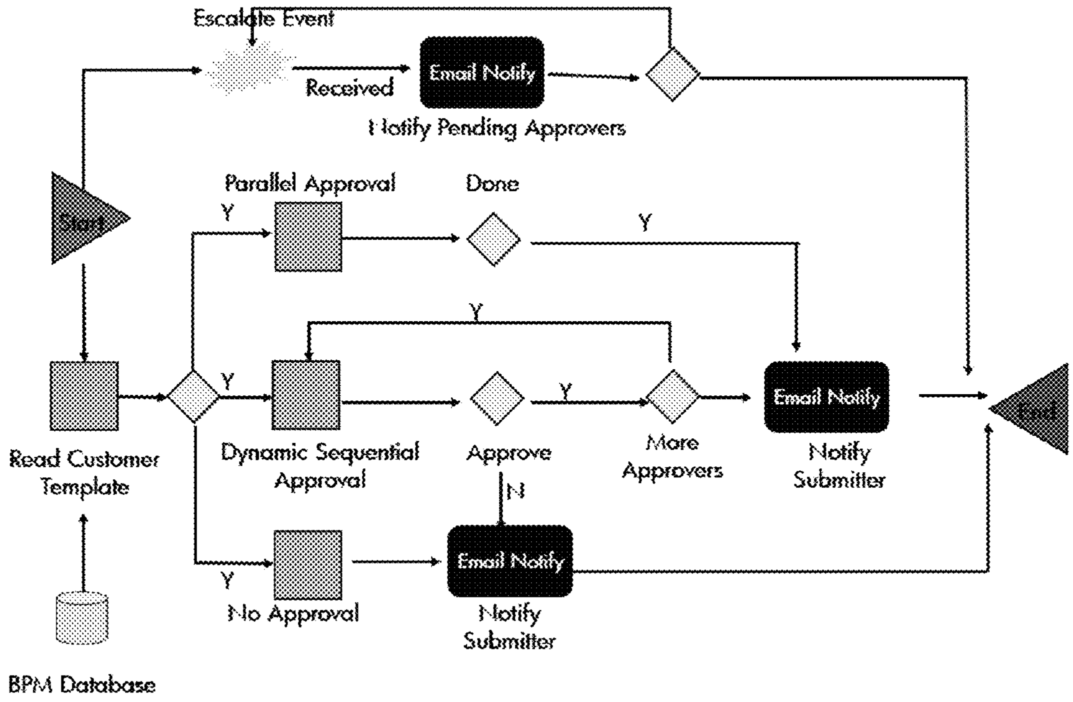
FIG. 5 illustrates an example process that may be represented in digital data stored in the data storage and managed using the BPM computer.

Processes and workflows, which are represented in digital data stored in the data storage and managed using the BPM computer 120, may be complex. A process may be defined as a graph of nodes and edges, optionally including references to one or more services that are used by the process and one or more resources that are used for the process. FIG. 5 illustrates an example process that may be represented in digital data stored in the data storage and managed using the BPM computer 120 and that could be used, for example, to arrange approval of a new quota value for an individual who is paid using an incentive compensation plan that requires achieving one or more sales quotas to reach specified compensation levels. The process of FIG. 5 could be used when a user terminal 102 creates and stores a quota approval form that includes a new quota, and submits the approval form for review and approval. The process includes an event escalation path, a parallel approval path, a dynamic sequential approval path in which feedback from later approval steps may be received, a no-approval path in which certain actions merely result in notification, communications both to a submitter computer associated with a submitter of a process and approver computers associated with approvers of a process. An example of a process requiring an approval chain might be the creation of a new quota for a salesperson who is compensated using an incentive compensation plan, or reviewing and approving an incentive compensation plan as a whole, or reviewing and approving an electronic text document such as any document created using a word processor.

In an embodiment, BPM computer 120 implements a process management system, provides an environment for the rapid creation and deployment of business processes, allows developers to build a complete solution around a business process by defining the process itself, the services used by the process, and the resources for the process. In an embodiment, back-end data and systems are defined in terms of available services. Processes are defined using a text editor that enables a developer to create an electronic document, such as an XML document, expressing a process in terms of steps or node that include and sequence calls to various back-end services, interweaved with calls to the user terminal, if needed. A process engine parses the electronic document according to a stored schema and then executes the process definitions at runtime based on a stored memory representation of the process that results from the parsing. A user interface generator enables defining process steps that use auto-generated user interface screens using HTML, WML or other markup technology. The form and contents of the UI are configurable per process or step within a process. Thus defining a process comprises defining a process flow as a sequence of nodes linked by transitions; defining service definitions; and defining data objects that support the process. Data objects may be defined by type and what nodes use or pass the objects.

An application as a whole may consist solely of one or more processes or workflows that have been defined using the BPM computer 120, or an application may comprise independent code that invokes one or more processes or workflows with the BPM computer for particular purposes. For example, an application could be implemented in JAVA and could define a workflow or process for one set of application behavior while also implementing other application behavior solely in JAVA.

Figure 2:
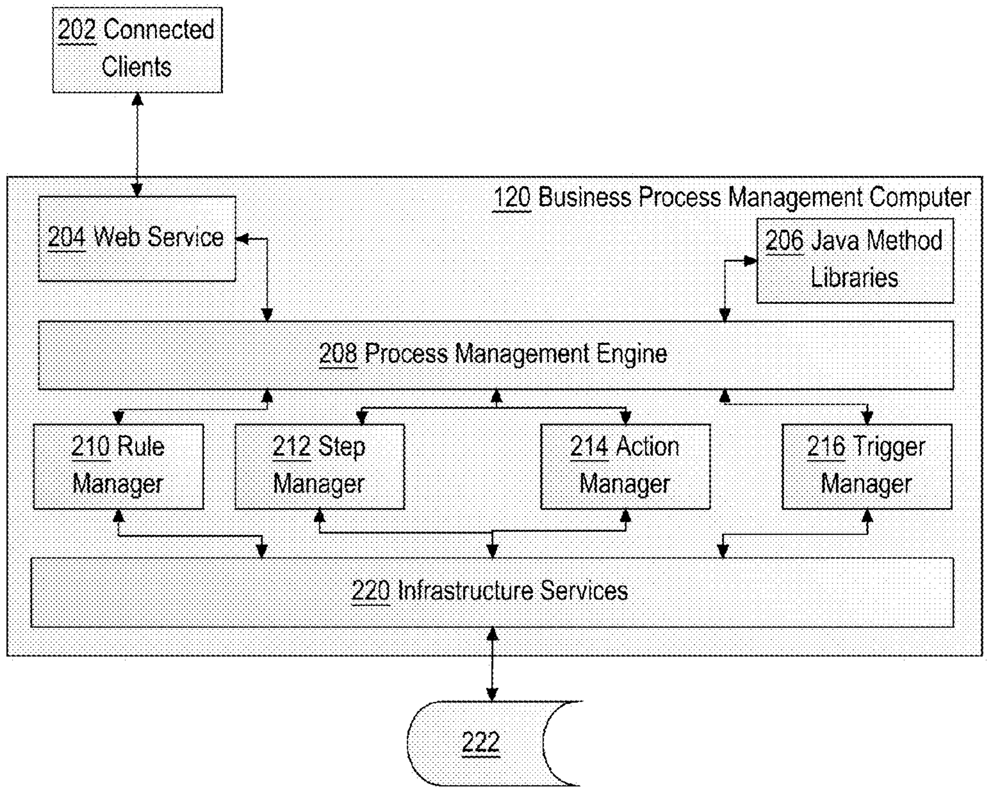
FIG. 2 illustrates an internal architecture of the business process management computer of FIG. 1

FIG. 2 illustrates an example internal architecture of BPM computer 120. In an embodiment, BPM computer 120 comprises a process management engine 208 that is coupled to a web service component 204 and JAVA method libraries 206, providing services to a plurality of connected clients 202, which may comprise user terminals, other application programs, or other transaction processing services. For example, applications module 124 could comprise the XACTLY INCENT system and could be arranged as a client 202 of the BPM computer 120. One or more such client processes communicate with the process management engine 208 through the web service 204. The process management engine 208 may be hosted in a JBOSS container and is configured or programmed to listen for requests that identify the web service XBPM, to service such requests and to return XBPM responses; requests arrive from, and responses are sent to, connected clients 202. Thus communication between the clients 202 and the engine 208 is a synchronous web service call. Web service 204 may use Axis to intercept web service requests and pass them on to the process management engine 208. XBPM requests and responses may be encapsulated as SOAP messages flowing over HTTP.

In an embodiment, process management engine 208 comprises a rule manager 210, step manager 212, action manager 214, and trigger manager 216 coupled to infrastructure services 220. Each of the rule manager 210, step manager 212, action manager 214, and trigger manager 216 may comprise one or more computer programs, other software elements, programmed logic such as ASICs or FPGAs, or a combination in the BPM computer 120.

In an embodiment, the rule manager 210 is responsible for evaluating routing rules; In an embodiment, rule manager 210 uses OGNL for evaluating rule expressions or arithmetic expressions and Jaxen for evaluating XPath expressions. OGNL is used when the variable value is a Java object, and Jaxen is used when the variable value is XML. Additionally, for complex rules, logic for a rule may be coded in a JAVA method and the process management engine 208 may call that method using reflection.

In an embodiment, step manager 212 is used to manage workflow models. A workflow model is represented as a directed graph, as described further in other sections herein.

In an embodiment, action manager 214 manages actions, such as assignment to a process variable, sending emails and calling external methods.

The trigger manager 216 is used to publish significant workflow events such as process suspension, process resumption, node suspension, node resumption, process activation and process completion. On occurrence of the above mentioned events the process management engine 208 can call an external method, send email etc.

Infrastructure services 220 may be programmed or configured to manage memory, storage, database resources and the like; for example the JAVA database interface JDBC may be one of the infrastructure services 220. The infrastructure services 220 also may broadly represent a virtual machine or other process that is configured or programmed to instantiate and/or manage objects, processes or threads.

FUNCTIONAL OVERVIEW

Process Model

In an embodiment, BPM computer 120 is programmed to receive definitions of processes as digital data representing a directed graph, comprising nodes and transitions between nodes, and with a set of constraints. In one embodiment, processes are defined in structured electronic documents, such as markup language documents in XML or a similar language. The appended TABLE A is an example process definition schema that may be used to define processes; TABLE B is an example service API that the process management engine 108 may be programmed to implement; TABLE C is an example definition of a process according to the schema of TABLE A. A process also includes process variables, rules, methods, email definitions, triggers and fail actions. Each node has a name. Each directed graph comprises nodes of the following types:

1. START STEP. A start step indicates where a process starts. One or more start steps per process are permitted. A transition cannot lead to a start step, and each start step may have only one transition from the start step to another node. If multiple start steps are defined, then each of the start steps is triggered sequentially in a sorted order based upon step name.

Figure 3:
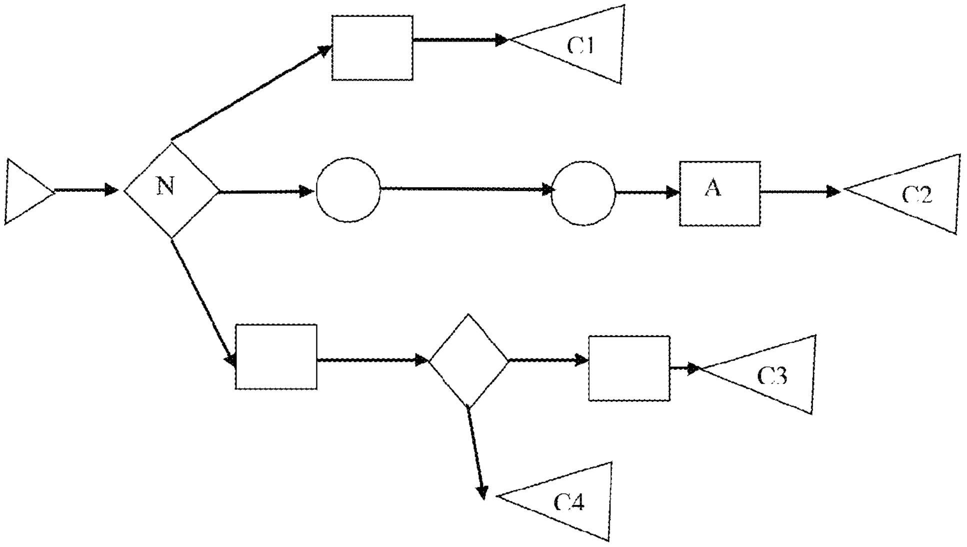
FIG. 3 illustrates an example of a process with multiple threads and done steps.

2. DONE STEP. A done step indicates where a process ends. Only one transition may lead in to a done step. A process, or thread of a process, ceases executing at the done step. For example, a decision node or split step may divide a process into three parallel threads, each thread having multiple nodes and terminating in one of three different done steps. FIG. 3 illustrates an example of a process with multiple threads and done steps. If a first thread reaches the first done step, only that thread terminates and the other two threads continue to execute until they reach their respective done steps.

Figure 4:
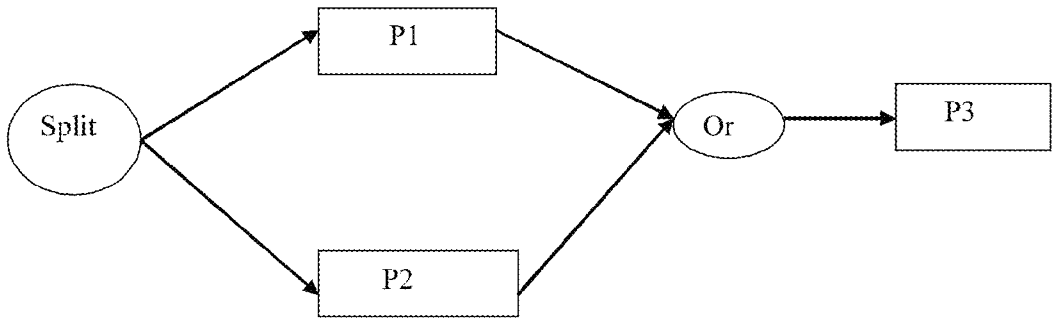
FIG. 4 illustrates an example of a split step and an OR step.

3. SPLIT STEP. A split step causes a fork in a process flow into two different parallel paths. FIG. 4 illustrates an example of a split step.

4. OR STEP. An OR node is used to receive process flow from two or more threads or paths and to transition to a single next node thereafter. Thus, an OR node may have two or more transitions as inputs and a single output transition to a single next node. The OR node transitions either input flow to the single next node. FIG. 4 illustrates an example of an OR step. An OR step is atomic in the sense that an immediate decision is made and a transition to one of two other steps occurs immediately.

5. AND STEP. The position of the OR step in FIG. 4 also could be, in another process, an AND step. An AND step is used to synchronize two or more parallel flows that transition into it. For example in the graph of FIG. 4, if P1 and P2 both transition to an And step and the And step transitions to P3, then if P1 completes processing, the process management engine 208 will wait for P2 to also complete processing before transitioning to P3.

6. DECISION STEP. A Decision step is a decision point within a process. Decision steps may define one or more tests to be carried out in a process flow. If a test is successful, then the outwards transitions are executed. Parallel execution is possible based on the evaluation of the transition rule. Decision steps are processed as atomic steps.

7. EXECUTION STEP. An execution step is used for executing JAVA methods that are deployed as a method library, sending emails and assigning values to variables. These executions are done based on the evaluation of a defined rule. An execution step is not required to wait, before transitioning to a next step in a defined process, until the last-called JAVA method returns. Instead, the specified JAVA methods are called and then the execution step transitions to the next step. Thus, execution steps are treated as atomic in the system.

8. PERFORMER STEP. A performer step represents a specific item of work within a process that is to be carried out by an end user application that is interacting with the process. In an embodiment, a process may define a performer step wherever the process needs to send work to a user application, user terminal or individual and receive a result after that work has been completed. An example of a performer step may be a call to a user application to prompt for user input for an ID number, date, or other data input. A performer step is required to wait, before transitioning to a next step in a defined process, until the last-called JAVA method returns.

9. SERVICE STEP. A service step represents a specific item of work within a process. In a service step a process specifies the service that will be called to carry out the work, and the data that is passed to or from this service. For example, a service step named GetPurchaseOrder may define an Employee_ID, Supplier_Details, and Upper_Cost_Limit as data items that are input, and may identify an internet path to a GetPO web service. The service step may also define that a PO_Number is returned as output. A service step may specify mappings of data objects. For example, in the process and in a user application, the data object Max Overall Price may be used for the same concept as Upper_Cost_Limit in the web service; data object mappings in the service step definition may correlate these two data objects. A service step is used to call a back end service that does not require any user interaction and that is implemented by one of your service providers. A service step is required to wait, before transitioning to a next step, until the called service completes execution.

10. TIMER STEP. A Timer Step is a time based step that causes the system to wait for a specified time period, which may be specified as an absolute date and time or a delta time from the time the step was activated, and then causes the outward transition.

11. SUB PROCESS STEP. When defining business processes a developer or user may find that there are some steps, or groups of steps, that are common between some of several processes. In an embodiment, these common steps can be defined as sub processes so that they can be defined once and then called as needed from the other processes. A Sub Process step can be invoked synchronously or asynchronously. In case of a synchronous sub process step, the out transition is executed after the completion of the sub process. For an asynchronous sub process, both the parent process and the sub process execute at the same time and independent of each other.

12. CONTAINER STEP. A container step contains other process steps; a container step necessarily includes one Start step and one Done Step. A container step may have a Group type or a Loop type. A Group Container step acts as a grouping for the process steps contained in it. It can be thought of a synchronous sub process step, the only difference being the contained steps are not reusable among different processes. A Loop container step is used for looping the set of process steps contained within the container step. It is repeated until the Loop Exit Rule returns true.

Based on the foregoing, it will be seen that the process management engine 208 executes using the following constraints on a directed graph of a process: There can be any number of start and done steps; A Start step must transition to one step and no transitions going in; A Done step must have no transitions going out; An And/Or step must have two or more transitions going into it; An And/Or step must have at least one transition going out of it; A container step must have one start and done step; Execution, Service, Performer, Container, Event, Sub Process steps have only one in and out transition; Split and Decision steps have one in transition and multiple out transitions; Start, Execution, Or, Split, And, Decision, Done, Asynchronous Sub Process are atomic steps; Atomic steps are steps which fire their outgoing transitions once activated; Event, Timer, Performer and synchronous Sub Process steps are non-atomic steps. The out transitions are triggered by external events or actions.

PROCESS RULES. In an embodiment, process management engine 108 is programmed to receive and execute rules that are associated with a transition from one process step to another in a workflow. During execution of the workflow, the server evaluates the rule on the work item to determine if a transition or some action is to be taken. In one implementation, a rule can be expressed in several ways including:

Rule Type 1: As a rule expression on a JAVA object property of a variable instance.

Rule Type 2: A method rule where the evaluation logic is implemented by a JAVA method.

Rule Type 3: As an XPATH expression on an XMLvariable instance.

In an embodiment, rule Type 1 uses an OGNL Expression parser for evaluation. Example expressions include:

5>4 && 3>2

(strVar1==strVar2)||(4>3)

(strVar1.equals(strVar3))

doubleVar2>intVar3 intList[4]>3 intList[4]>6

PROCESS VARIABLES. In an embodiment, process variables comprise key-value pairs that maintain information related to the process instance; any data structure that is capable of storing in a database may be used. In one embodiment, process variables are typed and may comprise: String; Integer; Double; DateTime; XML; Object; Document. The Document variable type may be a java.lang.String data type that holds references to the document. The XML data type may hold the XML instance value in a byte array. The Object data type may hold the following JAVA data types:

java.io.Serializable java.lang.String java.lang.Boolean java.lang.Character java.lang.Float java.lang.Double java.lang.Long java.lang.Byte java.lang.Short java.lang.Integer java.util.Date In one implementation, variables are a part of a process instance; saving the process instance in the database brings the database into synchronization with the process instance. The variables are created, updated and deleted from the database as a result of saving or updating the process instance in the database.

A Local variable may be a variable that is applicable only to performer steps. If multiple performers perform work on the same step, then a local variable may be used to track each performer's changes.

EVENTS. In an embodiment, process management engine 108 is programmed to configure a process to obtain information from external events by configuring listening steps. Event Steps may be defined for this purpose. Each event step references an event having a name and properties, and an event property can be bound to a corresponding process variable using configuration information provided to the process management engine 108 at the time that a process is defined.

EMAIL MESSAGES. In an embodiment, process management engine 108 is programmed to support configuring a process to send email notifications as part of actions or triggers. An action or trigger may define properties of email messages such as TO, CC, BCC, FROM Addresses, Subject and Body templates and then cause the process management engine 108 to dispatch an email message using a mail server process such as an SMTP server. Template files may be used to provide standard, repeatable values for subject lines and body information, and may be stored in process variables and referred in the email service definitions.

TRIGGERS. In an embodiment, process management engine 108 is programmed to support configuring a process to use one or more triggers. A trigger is used to publish significant workflow events, such as process suspension, process resumption, node suspension, node resumption, process activation and process completion; in an embodiment, when such a significant event occurs, process management engine 108 is configured to call an external method, send an email or take other actions. Step triggers are applicable only to performer and event steps.

TIMEOUTS. In an embodiment, process management engine 108 is programmed to support configuring a process to use one or more timeouts. Timeouts can be defined for the entire process or for performer and event nodes. If a timeout is defined for an entire process, then after the elapsed timeout period, the process management engine 108 may be programmed to ignore the timeout, suspend or terminate the instance. The elapsed time can be defined as an absolute time or the elapsed time from the start of the process instance. Timeouts can be applied to performer and event steps. If no work is done or an event arrives and timeout happens to a performer or an event step then the appropriate timeout action is taken by the process management engine 108.

FAIL ACTION. In an embodiment, process management engine 108 is programmed to support configuring a process to use one or more fail actions. If an exception occurs during processing of any process step, then the fail action is executed. In one embodiment, supported actions are Continue, Terminate or Suspend. Exceptions can occur if the service or action method throws an exception.

WORK ITEMS, WORK LISTS. In one embodiment, BPM computer 120 is configured or programmed to process work items and work lists. A work item is a set of electronically stored digital data that constitutes the main unit of data used by the BPM computer 120. Work lists comprise queues that may be established in main memory or in digital storage. The BPM computer 120 may comprise a BPM worklist server 126 that is configured or programmed to control user access to the work lists (real person or application), allows an administrator to manage work lists, and allows an administrator to specify the access to work lists.

In an embodiment, the process management engine 108 is programmed using a listener method that accesses work items in a work list that has been allocated for that purpose. Work items, in one embodiment, may be structured as XML documents. The process management engine 108 is programmed to create and store in main memory an XML data type that holds XML data extracted from an incoming XML document. In an embodiment, the XML data type can process XML data at two levels of abstraction. A first level is XML data items that represent a hierarchical XML data structure. The second level is scalar items that represent the values within an XML data structure. The programmer specifies how to extract the XML data in the document handler that processes the incoming XML document. A process can write values back to the XML data within the process, if the required XML data structure is passed into the process.

Figure 6:
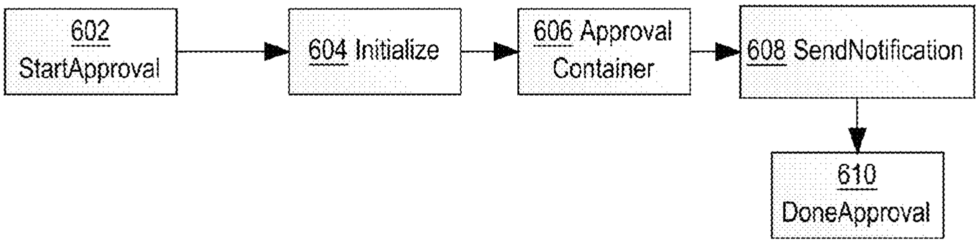
FIG. 6, FIG. 7 collectively illustrate an example of a process that may be used to develop other, more complex processes such as the process of FIG. 5, in terms of generically named steps or nodes.
Figure 7:
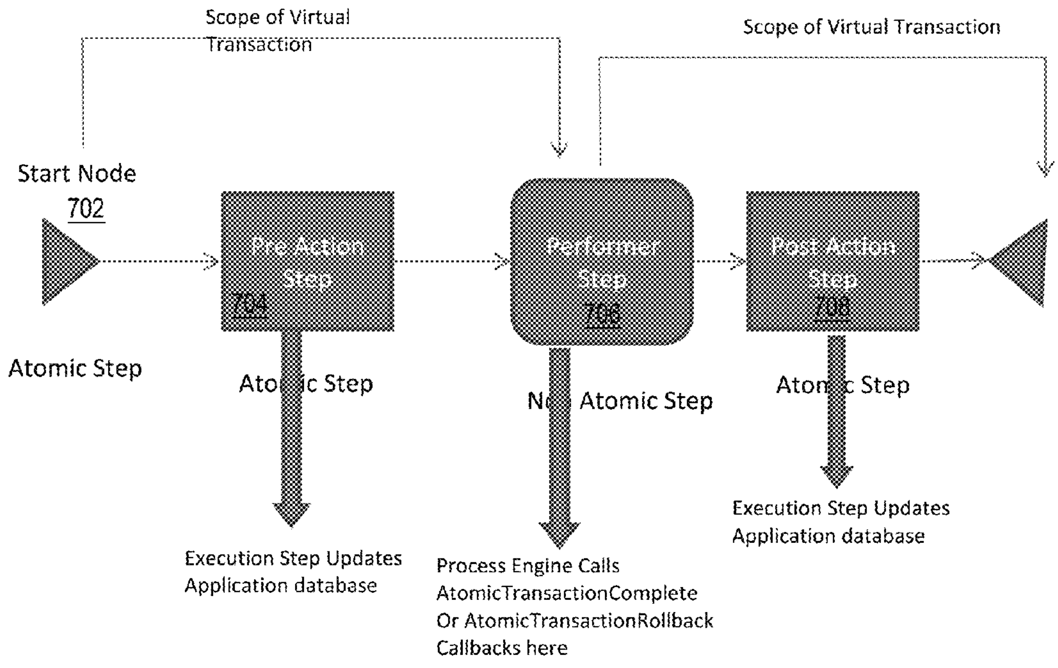

EXAMPLE. FIG. 6, FIG. 7 illustrate examples of generic process that may be used to develop other, more complex processes such as the process of FIG. 5. Referring first to FIG. 6, in one use case, a user terminal 102 may interact with a graphical process definition tool that is programmed in the process management engine 108 to create a process comprising a StartApproval node 602, Initialize node 604, ApprovalContainer node 606, SendNotification node 608, and DoneApproval node 610. The StartApproval node 602 is configured using a Start step and represents a start point of the process; similarly the DoneApproval node 610 is programmed using a Done step and represents an end point. The Initialize node 604 may be an Action step that performs executable actions such as initialization of variables and objects that support the process. The ApprovalContainer node 606 also may represent an Action step that can call out to a sub process as described for FIG. 7. The SendNotification node 608 may comprise an Email step and may cause generating and sending an e-mail message to a user terminal.

Turning now to FIG. 7, in one example, reaching the ApprovalContainer node 606 in FIG. 6 may cause initially executing the Start Node 702, which acts as a start point for the sub process of FIG. 7. A PreAction step 704 may implement preparation steps that are necessary such as checking variable values for conformance to rules, verifying that passed-in objects are present and do not contain out-of-range values, etc. Assume for purposes of an example that the PreAction step 704 is an execute step and calls a JAVA method to update a document instance's status in an application database.

Next the Performer step 706 is reached, which is a non-atomic step, and a substantive step in the process is performed. Assume that the Performer step 706 prompts the user terminal 102 to perform an approval action and waits for responsive input from the user terminal before transitioning. The process engine calls either the AtomicTransactionComplete callback or AtomicTransactionRollback callback.

After Performer step 706, PostAction 708 step follows and may include steps such as updating variable values to persistent storage, calling external services, or generating alerts, notifications or update e-mails. The application database could be further updated. A transition to a terminal node representing an end state may occur. Thus, the steps of FIG. 7 are arranged as a first virtual transaction and second virtual transaction as seen in FIG. 7.

"ATOMICTRANSACTIONCOMPLETE" CALLBACK AT QUIESCENT STATE; "ATOMICTRANSACTIONROLLBACK" CALLBACK AT ERROR CONDITION

A problem in this context may be that the variables or objects associated with a particular step may not be in a correct state when process flow reaches the non-atomic step, such as performer step 706. For example, as noted above, execution steps such as PreAction step 704 are treated as atomic, and the various library methods potentially could update the datastore associated with the application that is being orchestrated, but performer steps like performer step 706 are required to wait until externally called services or requests are performed or executed, and a return signal is received or user input is received. Due to the high concurrent nature of a multi-tenant application, the application state could be updated. For example, in the case of a document workflow, a work item could be pushed into the performer queue before the process engine commits its state to its datastore and the performer could decide to apply work and this difference in behavior could result in timing errors. An example error might be "work item not applicable to this process".

For example, returning to the example of FIG. 7, suppose that the JAVA method is called in the PreAction step 704, but does not complete an update at the time that user input from user terminal 102 is received at the PerformAction step 706. This situation may cause an error because the user terminal 102 may attempt to act upon a document that is in the wrong state because the JAVA method called at step 704 did not complete posting a status update, for example, due to database latency, loss of network connectivity in a downstream system, when a method or external service is required to read, write or update a very large number of records or otherwise requires significant execution time, etc.

FIG. 8 illustrates a process of implementing virtual transactions in a workflow management system using an AtomicTransactionComplete callback and an AtomicTransactionRollback callback. According to an embodiment, steps that are defined as having an atomic type, such as Execution steps, are implemented in the process management engine 108 using additional programming steps that cause the engine to perform a callback after executing a series of atomic steps transitioning to a non-atomic step after completing the atomic steps successfully or incurred an error. These operations may be termed as AtomicTransactionComplete callback and an AtomicTransactionRollback callback and apply to actions that were executed as part of the atomic steps. The terms AtomicTransactionComplete and AtomicTransactionRollback are used only to illustrate a clear example, and different terms that convey similar concepts or meanings may be used in other embodiments. For example the AtomicTransactionComplete callback could be termed a completion callback and the AtomicTransactionRollback callback could be termed an error callback. "Callback," in this context, means that the process management engine 108 calls back to the underlying application for the purpose of providing signals or messaging that the application may act upon.

Also for purposes of illustrating a clear example, FIG. 8 is described herein in relation to FIG. 7. Further, FIG. 8 may serve as an outline of an algorithm or functional specification for one or more computer programs or programmable logic of the process management engine 108 that may be used to implement the general techniques now described for FIG. 8.

At block 802, a process definition schema defines an AtomicTransactionComplete callback for use when the atomic step is complete and defines an AtomicTransactionRollback callback for use when the atomic step reaches an error condition, and the execution engine that manages process flows is programmed to process such callbacks with ordinary step transitions or rollbacks or to notify an underlying application to advance or perform rollbacks or other error correction. Block 802 may be implemented by editing and storing an XML document, for example, that conforms to the schema of TABLE A and additionally includes calls to an AtomicTransactionComplete callback and/or an AtomicTransactionRollback callback of the process management engine 108 under specified logic conditions expressed in the XML document. Calls may be specified using tags or statements in the XML document. The process management engine 108 is programmed, in response to the AtomicTransactionComplete callback, to transition from a calling step to a next step in a defined process flow. The process management engine 108 is programmed, in response to the AtomicTransactionRollback callback, to perform a rollback of the state of the application datastore that the atomic steps had modified. Or, with the AtomicTransactionRollback callback, the process management engine 108 may call back to an underlying application and provide a signal or message that a rollback or other error processing should be performed with respect to an application datastore or other resource.

At block 804, steps in the process flow of the XML document that are not an atomic type, and that flow from atomic steps in the process, define calls to the AtomicTransactionComplete callback and to the AtomicTransactionRollback callback based upon state data that is received via prior atomic steps. For example, steps in the same process that is defined in the XML document of block 802, and that are downstream from the atomic step(s) defined at block 802, are programmed to call the AtomicTransactionComplete callback and the AtomicTransactionRollback callback of the process management engine 108 using appropriate tags or statements in the XML document under specified conditions based upon state data or signals as further described herein.

After block 802 and block 804 it is assumed for purposes of FIG. 8 that the resulting schema and XML document with a defined process flow is persistently stored and then provided to process management engine 108 for parsing and execution.

During execution after parsing, at block 806, one of the atomic steps starts and invokes an external method. For example, a JAVA method or a web service could be invoked. Because the step is atomic, a transition occurs immediately to the next step in the workflow. For purposes of FIG. 8, that next step is presumed to be non-atomic, and executes at block 820 and successive blocks after block 820. For example at block 822 the non-atomic step performs one or more actions that are not dependent upon the prior atomic step.

Returning to the atomic step, either a normal completion path or an error completion path are possible depending on the result of the externally called method or service. At block 808, the atomic step receives a return signal from the external method or service indicating normal completion. Therefore at block 810 the atomic step updates a state value or otherwise signals the non-atomic steps that an AtomicTransactionComplete callback may be used. Referring again to the non-atomic flow, at block 824 the AtomicTransactionComplete callback is invoked at the non-atomic step based on the state value as tested at step 823, and therefore the execution engine and/or application proceeds with normal execution of the next instructions or logic defined in that step, as seen at block 826. At this point the non-atomic step will be free of race conditions, timing issues or other faults that could arise from errors in execution of the atomic step in the flow starting at block 806.

But assume now that an error does occur in the method or service that has been externally called at block 806. In that case at block 812 the atomic step receives an error signal from the external method and therefore the atomic step updates the state value to indicate an error or otherwise signals the non-atomic step that an AtomicTransactionRollback callback is needed, at block 814.

Over at the non-atomic flow, the AtomicTransactionRollback callback will be invoked at block 828 after block 822, block 823. Therefore the execution engine may perform one or more rollback or update operations at block 830, or signal the underlying application to do the same or other error correction, before proceeding with next execution steps at block 826 or another block. For example the execution engine may roll back the state of an application datastore that had been updated by the atomic steps or methods that the atomic steps invoked, or may signal an application to do so. In this manner the non-atomic step in a workflow can recover from errors that have occurred in a prior step that was expected to exhibit atomic behavior. A subsequent virtual atomic transaction may begin, as seen in the right side portion of FIG. 7.

Referring again to FIG. 7, in an embodiment, execution of the PreAction step 704 would include executing the AtomicTransactionComplete callback when the JAVA method has returned, because at that point a quiescent state has been reached within the PreAction step 704 and the objects with which it interacts. Further, code implementing performer steps, such as the PerformAction step 706, registers for the AtomicTransactionComplete callback. With this approach, the process management engine 108 may execute the PerformAction step 706 but may delay prompting the user terminal to perform an action until receiving a signal via the AtomicTransactionComplete callback.

The specific action that is executed while waiting for the AtomicTransactionComplete callback signal may vary in different implementations as may include, for example, entering a wait state; display graphical user interface elements at user terminal 102 in a grayed-out or unavailable state; displaying an interstitial page or screen element that requests waiting; and so forth. Or, the performer step may be programmed to execute normally, but to defer attempting any of the CRUD operations on a particular external object, such as a document or database record, until the callback signal is received. With that approach, the performer step could prompt the user terminal 102 to take specified action and even receive user input from the user terminal, but not undertake a read, write or delete of an object in memory, storage or a database that could be in an improper state.

The specific responsive action or the use of a state value is not critical. What is important is that perform step has the capability to detect completion of a prior step of a type that is expected to exhibit atomic behavior and that may require the perform step to take different action or delay action until completion occurs.

Similarly, steps that are non-atomic or subject to waiting or race conditions may register for an AtomicTransactionRollback callback, and atomic steps may execute the AtomicTransactionRollback callback if an error occurs during execution of an atomic operation. Continuing with the example of FIG. 7, assume that the JAVA method called in the PreAction step 704 throws an error. In response, code implementing the PreAction step 704 in the process management engine 108 executes an AtomicTransactionRollback callback. As with the AtomicTransactionComplete callback, the PerformAction step 706 receives a signal that an error occurred in the PreAction step 704. In response, at the PerformAction step 706 the process management engine 108 may perform any of several actions such as a rollback of a state variable, a rollback of a database record or state, updating an internal state variable so that a downstream OR step (not shown) causes a transition back to the PreAction step 704 to try again, changing an indication in an interface of the user terminal that indicates a previously PENDING document or step is now in an AtomicTransactionRollback state, etc.

The specific responsive action or the use of a state value is not critical. What is important is that perform step has the capability to detect an error occurring in a prior step of a type that is expected to exhibit atomic behavior and that may require a rollback, state change or other action when an error unexpectedly occurs.

Use of the AtomicTransactionComplete callback and AtomicTransactionRollback callback may be specified in a process definition in an XML document of the type seen in TABLE A, TABLE C. Each step that is defined in an XML process definition may specify registration for the AtomicTransactionComplete callback and the AtomicTransactionRollback callback and also may specify methods, external services, or other actions to be performed conditionally if the AtomicTransactionComplete callback is signaled and/or if the AtomicTransactionRollback callback is signaled.

In this disclosure, the terms “AtomicTransactionComplete” and “AtomicTransactionRollback” have been used for convenience, but those specific labels are not required in embodiments; the terms “completion callback” and “error callback,” respectively are equivalent and could be used, as-is or with adaptation.

As a result, timing conflicts and race conditions may be more effectively avoided in a process as a whole. In prior systems, these conflicts can cause a system to halt due to race conditions, throw errors, or exhibit other anomalous behavior that may require manual intervention to correct the state of documents, state variables or stored records. For example, the atomic steps in FIG. 7 may be arranged to update different database records in each different step, and once the execution engine transitions to a non-atomic step it permits the application which is being orchestrated to recover from any error that happened in a previous step. In the case of the completion callback, the solution herein permits the application to update its database records, ensuring that the engine is in the correct state and thus ensuring consistency between the application database and the process engine database.

Further, undesirable alternatives can be avoided such as the introduction of intentional wait steps, user input steps, or other compensation steps that may have been interposed solely to force waiting or delay. Instead, a transition from an atomic step to a perform step or other non-atomic may occur directly, yet the perform step or other non-atomic step may detect completion of the prior atomic step and avoid taking actions that could conflict if the prior atomic step is incomplete. Consequently, definition of a virtual transaction is simplified, as a series of steps in a process may collectively exhibit atomic behavior by acting only when specified sub steps are complete and by internally processing rollbacks or other consequences of error conditions.

In other words, the entire process shown in FIG. 7 now can be defined in an atomic manner. This enables developers of processes and workflows to define an entire process, or a sub process as in FIG. 7, as an atomic transaction in which downstream steps do not advance until upstream steps have completed, and in which errors in upstream steps are signaled to downstream steps so that rollbacks can be implemented. As a result, the workflow development process is vastly simplified and made more efficient.

Embodiments may be used in any environment in which a defined workflow is desirable to facilitate organized computer processing. Examples include quota approval, document approval, objective approach, storage updates or data pipeline management, and the like. In multi-tenant database systems in which high read-write loads are experienced, the timing issues described herein may be acute, so the benefits provided by the solutions herein can result in significant improvements in transaction throughput, fewer errors, and less usage of memory and storage to record error log entries, error messages and the like. In addition, less network bandwidth is consumed when transactions can proceed without errors as there is no need to consume bandwidth for the purpose of displaying error messages on user terminals, warning messages about inconsistent states of datastores and the like.

IMPLEMENTATION EXAMPLE

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
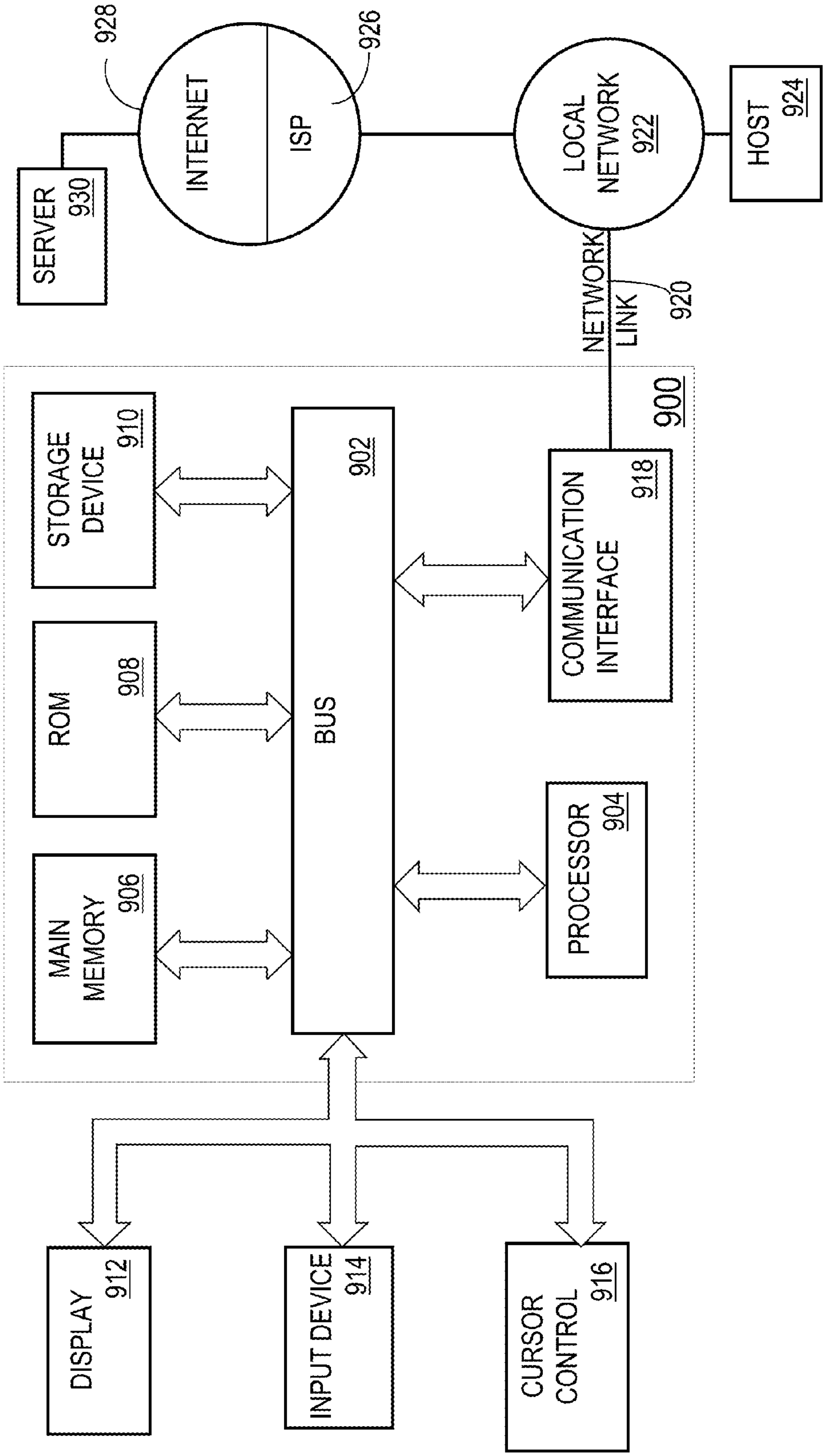
FIG. 9 illustrates a computer system with which embodiments may be used.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

TABLE A

Process Definition Schema

```
<?xml version="1.0"encoding="UTF-8"?>
<xs:schema
    xmlns:xs="http://www.w3.org/2001/XMLSchema"
    xmlns:xbpm="http://xbpm.xactly.com/schema"
    targetNamespace="http://xbpm.xactly.com/schema"
    elementFormDefault="qualified">
  <xs:element name="ProcessFlow" type="xbpm:ProcessFlowType" />
  <xs:complexType name="ProcessFlowType" >
    <xs:sequence>
      <xs:element type="xs:string" name="Description" minOccurs="0"/>
      <xs:element type="xbpm:VariableListType" name="Variables" minOccurs="0"/>
      <xs:element type="xbpm:MethodListType" name="Methods" minOccurs="0"/>
      <xs:element type="xbpm:RuleListType" name="Rules" minOccurs="0"/>
      <xs:element type="xbpm:ProcessTriggerType" name="Trigger" minOccurs="0" maxOccurs="4"/>
      <xs:element type="xbpm:EmailServiceListType" name="Emails" minOccurs="0"/>
      <xs:element type="xbpm:EventListType" name="Events" minOccurs="0"/>
      <xs:element type="xbpm:StartStepType" name="StartStep" minOccurs="1"
maxOccurs="unbounded"/>
      <xs:element type="xbpm:DoneStepType" name="DoneStep" minOccurs="1"
maxOccurs="unbounded"/>
      <xs:element type="xbpm:AndStepType" name="AndStep" minOccurs="0" maxOccurs="unbounded"/>
      <xs:element type="xbpm:OrStepType" name="OrStep" minOccurs="0" maxOccurs="unbounded"/>
      <xs:element type="xbpm:SplitStepType" name="SplitStep" minOccurs="0"
maxOccurs="unbounded"/>
      <xs:element type="xbpm:DecisionStepType" name="DecisionStep" minOccurs="0"
maxOccurs="unbounded"/>
```

TABLE A-continued

Process Definition Schema

```
            <xs:element type=“xbpm:ExecutionStepType” name=“ExecutionStep” minOccurs=“0”
maxOccurs=“unbounded”/>
            <xs:element type=“xbpm:PerformerStepType” name=“PerformerStep” minOccurs=“0”
maxOccurs=“unbounded”/>
            <xs:element type=“xbpm:EventStepType” name=“EventStep” minOccurs=“0”
maxOccurs=“unbounded”/>
            <xs:element type=“xbpm:TimerStepType” name=“TimerStep” minOccurs=“0”
maxOccurs=“unbounded”/>
            <xs:element type=“xbpm:SubProcessStepType” name=“SubProcessStep” minOccurs=“0”
maxOccurs=“unbounded”/>
            <xs:element type=“xbpm:ServiceStepType” name=“ServiceStep” minOccurs=“0”
maxOccurs=“unbounded”/>
            <xs:element type=“xbpm:ContainerStepType” name=“ContainerStep” minOccurs=“0”
maxOccurs=“unbounded”/>
            <xs:element type=“xbpm:TimeoutActionType” name=“TimeoutAction” minOccurs=“0” />
            <xs:element type=“xbpm:FailActionType” name=“FailAction” minOccurs=“0” />
              <xs:element type=“xbpm:AtomicTransactionCompleteType”
name=“AtomicTransactionCompleteAction” minOccurs=“0” />
            <xs:element type=“xbpm:AtomicTransactionRollbackType” name=“AtomicTransactionRollbackAction”
minOccurs=“0”/>
          </xs:sequence>
            <xs:attribute name=“Name” type=“xs:string” use=“required”/>
            <xs:attribute name=“Version” type=“xs:string” use=“required”/>
            <xs:attribute name=“Author” type=“xs:string” use=“required”/>
            <xs:attribute name=“State” use=“required”>
              <xs:simpleType>
                <xs:restriction base=“xs:string”>
                  <xs:enumeration value=“Persistenr”>
                  <xs:enumeration value=“Transient”>
                </xs:restriction>
              </xs:simpleType>
            </xs:attribute>
        </xs:complexType>
          <xs:complexType name=“VariableListType”>
            <xs:sequence>
              <xs:element type=“xbpm:VariableType” name=“Variable” minOccurs=“0” maxOccurs=“unbounded” />
            </xs:sequence>
          </xs:complexType>
          <xs:complexType name=“MethodListType” >
            <xs:sequence>
              <xs:element type=“xbpm:MethodType” name=“Method” minOccurs=“0” maxOccurs=“unbounded” />
            </xs:sequence>
          </xs:complexType>
          <xs:complexType name=“RuleListType”>
            <xs:sequence>
              <xs:element type=“xbpm:RuleType” name=“Rule” minOccurs=“0” maxOccurs=“unbounded” />
          </xs:sequence>
        </xs:complexType>
        <xs:complexType name=“EventListType”>
          <xs:sequence>
            <xs:element type=“xbpm:EventType” name=“Event” minOccurs=“0” maxOccurs=“unbounded” />
          </xs:sequence>
        </xs:complexType>
        <xs:complexType name=“EmailServiceListType”>
          <xs:sequence>
            <xs:element type=“xbpm:EmailServiceType” name=“Email” minOccurs=“0” maxOccurs=“unbounded”
/>
          </xs:sequence>
        </xs:complexType>
        <xs:complexType name=“ProcessTriggerType”>
          <xs:sequence>
            <xs:element type=“xbpm:ActionRuleListType” name=“ActionRules” minOccurs=“0” />
          </xs:sequence>
          <xs:attribute name=“Name” use=“required”>
            <xs:simpleType>
              <xs:restriction base=“xs:string”>
                <xs:enumeration value=“Activated”/>
                <xs:enumeration value=“Completed”/>
                <xs:enumeration value=“Suspended”/>
                <xs:enumeration value=“Resumed”/>
                <xs:enumeration value=“Terminated”/>
              </xs:restriction>
            </xs:simpleType>
          </xs:attribute>
        </xs:complexType>
        <xs:complexType name=“StepTriggerType”>
          <xs:sequence>
            <xs:element type=“xbpm:ActionRuleListType” name=“ActionRules” minOccurs=“0” />
```

TABLE A-continued

Process Definition Schema

```
        </xs:sequence>
        <xs:attribute name=“Name” use=“required”>
            <xs:simpleType>
                <xs:restriction base=“xs:string”>
                    <xs:enumeration value=“Activated”/>
                    <xs:enumeration value=“Completed”/>
                    <xs:enumeration value=“Suspended”/>
                    <xs:enumeration value=“Resumed”/>
                    <xs:enumeration value=“Terminated”/>
                </xs:restriction>
            </xs:simpleType>
        </xs:attribute>
    </xs:complexType>
<xs:complexType name=“TimeoutActionType”>
        <xs:sequence>
            <xs:element type=“xbpm:TimerExpressionType” name=“TimerExpression”/>
        </xs:sequence>
        <xs:attribute name=“Action” use=“required”>
            <xs:simpleType>
                <xs:restriction base=“xs:string”>
                    <xs:enumeration value=“Continue”/>
                    <xs:enumeration value=“Terminate”/>
                    <xs:enumeration value=“Suspend”/>
                    <xs:enumeration value=“Resume”/>
                </xs:restriction>
            </xs:simpleType>
        </xs:attribute>
    </xs:complexType>
<xs:complexType name=“FailActionType”>
        <xs:attribute name=“Action” use=“required”>
            <xs:simpleType>
                <xs:restriction base=“xs:string”>
                    <xs:enumeration value=“Continue”/>
                    <xs:enumeration value=“Terminate”/>
                    <xs:enumeration value=“Suspend”/>
                </xs:restriction>
            </xs:simpleType>
        </xs:attribute>
    </xs:complexType>
    <xs:complexType name=“AtomicTransactionCompleteType”>
        <xs:sequence>
            <xs:element type=“xs:string” name=“MethodCall” minOccurs=“1” maxOccurs=“1”/>
        </xs:sequence>
    </xs:complexType>
    <xs:complexType name=“AtomicTransactionRollbackType”>
        <xs:sequence>
            <xs:element type=“xs:string” name=“MethodCall” minOccurs=“1” maxOccurs=“1”/>
        </xs:sequence>
    </xs:complexType>
        <xs:complexType name=“ActionRuleListType”>
            <xs:sequence>
                <xs:element type=“xbpm:ActionRuleType” name=“ActionRule” minOccurs=“0”
maxOccurs=“unbounded” />
            </xs:sequence>
        </xs:complexType>
    <xs:complexType name=“VariableType”>
        <xs:sequence>
            <xs:element type=“xs:string” name=“Description” minOccurs=“0”/>
            <xs:element type=“xs:string” name=“Value” minOccurs=“0” />
            <xs:element type=“xs:string” name=“ObjectType” minOccurs=“0” />
        </xs:sequence>
        <xs:attribute name=“Name” type=“xs:string” use=“required”/>
        <xs:attribute name=“DataType” use=“required”>
            <xs:simpleType>
                <xs:restriction base=“xs:string”>
                    <xs:enumeration value=“STRING” />
                    <xs:enumeration value=“DOUBLE”/>
                    <xs:enumeration value=“INTEGER” />
                    <xs:enumeration value=“DATETIME”/>
                    <xs:enumeration value=“XML”/>
                    <xs:enumeration value=“DOCUMENT”/>
                    <xs:enumeration value=“OBJECT”/>
                </xs:restriction>
            </xs:simpleType>
        </xs:attribute>
        <xs:attribute name=“VariableType” use=“required”>
            <xs:simpleType>
                <xs:restriction base=“xs:string”>
```

TABLE A-continued

Process Definition Schema

```
                <xs:enumeration value="GLOBAL"/>
                <xs:enumeration value="LOCAL"/>
            </xs:restriction>
        </xs:simpleType>
    </xs:attribute>
</xs:complexType>
<xs:complexType name="MethodType">
    <xs:sequence>
        <xs:element type="xs:string" name="Description" minOccurs="0"/>
        <xs:element type="xbpm:MethodParamType" name="MethodParam" minOccurs="0"
    maxOccurs="unbounded" />
    </xs:sequence>
    <xs:attribute name="Name" type="xs:string" use="required"/>
    <xs:attribute name="ClassName" type="xs:string" use="required"/>
    <xs:attribute name="MethodName" type="xs:string" use="required"/>
</xs:complexType>
<xs:complexType name="MethodParamType" >
    <xs:sequence>
        <xs:element type="xs:string" name="Value" />
    </xs:sequence>
    <xs:attribute name="Type" use="required">
        <xs:simpleType>
            <xs:restriction base="xs:string">
                <xs:enumeration value="CONSTANT"/>
                <xs:enumeration value="VARIABLE"/>
            </xs:restriction>
        </xs:simpleType>
    </xs:attribute>
</xs:complexType>
<xs:complexType name="ServiceMethodParamType">
    <xs:sequence>
        <xs:element type="xs:string" name="Value" />
    </xs:sequence>
    <xs:attribute name="ParamName" type="xs:string" use="required"/>
    <xs:attribute name="ParamNameSpace" type="xs:string" use="required"/>
    <xs:attribute name="ParamType" type="xs:string" use="required"/>
    <xs:attribute name="Type" use="required">
        <xs:simpleType>
            <xs:restriction base="xs:string">
                <xs:enumeration value="CONSTANT"/>
                <xs:enumeration value="VARIABLE"/>
            </xs:restriction>
        </xs:simpleType>
    </xs:attribute>
</xs:complexType>
<xs:complexType name="RuleType">
    <xs:sequence>
        <xs:element type="xbpm:RuleExpressionType" name="ExpressionRule" minOccurs="0"/>
        <xs:element type="xbpm:XPathRuleExpressionType" name="XPathRule" minOccurs="0"/>
        <xs:element type="xbpm:MethodRuleType" name="MethodRule" minOccurs="0"/>
    </xs:sequence>
</xs:complexType>
<xs:complexType name="EventType" >
    <xs:sequence>
        <xs:element type="xs:string" name="Description" minOccurs="0"/>
        <xs:element type="xbpm:EventPropertyType" name="EventProperty" minOccurs="0"
maxOccurs="unbounded"/>
    </xs:sequence>
    <xs:attribute name="Name" type="xs:string" use="required"/>
</xs:complexType>
<xs:complexType name="EventPropertyType" >
    <xs:attribute name="PropertyName" type="xs:string" use="required"/>
    <xs:attribute name="DataType" use="required">
        <xs:simpleType>
            <xs:restriction base="xs:string">
                <xs:enumeration value="STRING"/>
                <xs:enumeration value="DOUBLE"/>
                <xs:enumeration value="INTEGER"/>
                <xs:enumeration value="DATETIME"/>
                <xs:enumeration value="XML"/>
                <xs:enumeration value="DOCUMENT"/>
                <xs:enumeration value="OBJECT"/>
            </xs:restriction>
        </xs:simpleType>
    </xs:attribute>
</xs:complexType>
<xs:complexType name="EventBindingType">
    <xs:sequence>
```

TABLE A-continued

Process Definition Schema

```
        <xs:element type=“xbpm:EventBindingPropertyType” name=“EventBinding” minOccurs=“0”
maxOccurs=“unbounded”/>
      </xs:sequence>
      <xs:attribute name=“EventName” type=“xs:string” use=“required”/>
    </xs:complexType>
    <xs:complexType name=“EventBindingPropertyType” >
      <xs:attribute name=“EventPropertyName” type=“xs:string” use=“required”/>
      <xs:attribute name=“VariableName” type=“xs:string” use=“required”/>
    </xs:complexType>
    <xs:complexType name=“TimerExpressionType” >
      <xs:sequence>
        <xs:element type=“xs:string” name=“Value” minOccurs=“0”/>
      </xs:sequence>
      <xs:attribute name=“Type” use=“required”>
        <xs:simpleType>
          <xs:restriction base=“xs:string”>
            <xs:enumeration value=“ABSOLUTE”/>
            <xs:enumeration value=“DELTA”/>
          </xs:restriction>
        </xs:simpleType>
      </xs:attribute>
    </xs:complexType>
    <xs:complexType name=“RuleExpressionType”>
      <xs:sequence>
        <xs:element type=“xs:string” name=“Description” minOccurs=“0”/>
        <xs:element type=“xs:string” name=“Expression” minOccurs=“0”/>
      </xs:sequence>
      <xs:attribute name=“Name” type=“xs:string” use=“required”/>
    </xs:complexType>
    <xs:complexType name=“XPathRuleExpressionType”>
      <xs:sequence>
        <xs:element type=“xs:string” name=“Description” minOccurs=“0”/>
        <xs:element type=“xs:string” name=“Expression” minOccurs=“0”/>
        <xs:element type=“xs:string” name=“XmlVariable” minOccurs=“0”/>
      </xs:sequence>
      <xs:attribute name=“Name” type=“xs:string” use=“required”/>
    </xs:complexType>
    <xs:complexType name=“MethodRuleType”>
      <xs:sequence>
        <xs:element type=“xs:string” name=“Description” minOccurs=“0”/>
        <xs:element type=“xs:string” name=“MethodCall” minOccurs=“0”/>
      </xs:sequence>
      <xs:attribute name=“Name” type=“xs:string” use=“required”/>
    </xs:complexType>
    <xs:complexType name=“IOVariableType”>
      <xs:sequence>
        <xs:element type=“xs:string” name=“VariableName” minOccurs=“0” maxOccurs=“unbounded”/>
      </xs:sequence>
    </xs:complexType>
    <xs:complexType name=“ActionRuleType”>
      <xs:sequence>
        <xs:element type=“xbpm:AssignActionType” name=“AssignAction” minOccurs=“0”
maxOccurs=“unbounded”/>
        <xs:element type=“xbpm:MethodActionType” name=“MethodAction” minOccurs=“0”
maxOccurs=“unbounded”/>
        <xs:element type=“xbpm:EmailActionType” name=“EmailAction” minOccurs=“0”
maxOccurs=“unbounded”/>
      </xs:sequence>
        <xs:attribute name=“RuleName” type=“xs:string” use=“required”/>
    </xs:complexType>
    <xs:complexType name=“AssignActionType”>
      <xs:sequence>
        <xs:element type=“xs:string” name=“Value” minOccurs=“0” />
      </xs:sequence>
      <xs:attribute name=“FromType” use=“required”>
          <xs:simpleType>
            <xs:restriction base=“xs:string”>
              <xs:enumeration value=“CONSTANT”/>
              <xs:enumeration value=“VARIABLE”/>
            </xs:restriction>
          </xs:simpleType>
      </xs:attribute>
      <xs:attribute name=“ToVariable” type=“xs:string” use=“required”/>
    </xs:complexType>
    <xs:complexType name=“MethodActionType”>
      <xs:attribute name=“ToVariable” type=“xs:string” use=“required”/>
      <xs:attribute name=“MethodName” type=“xs:string” use=“required”/>
    </xs:complexType>
```

TABLE A-continued

Process Definition Schema

```
<xs:complexType name="EmailActionType">
  <xs:attribute name="EmailServiceName" type="xs:string" use="required"/>
</xs:complexType>
<xs:complexType name="ParamType">
  <xs:sequence>
    <xs:element type="xs:string" name="Value" minOccurs="0" />
  </xs:sequence>
  <xs:attribute name="Type" use="required">
      <xs:simpleType>
        <xs:restriction base="xs:string">
          <xs:enumeration value="CONSTANT"/>
          <xs:enumeration value="VARIABLE"/>
        </xs:restriction>
      </xs:simpleType>
  </xs:attribute>
</xs:complexType>
<xs:complexType name="EmailServiceType">
  <xs:sequence>
    <xs:element type="xs:string" name="Description" minOccurs="0"/>
    <xs:element type="xbpm:EmailAddressType" name="Address" minOccurs="0" maxOccurs="4" />
    <xs:element type="xbpm:EmailTemplateType" name="Template" minOccurs="0" maxOccurs="2" />
  </xs:sequence>
  <xs:attribute name="Name" type="xs:string" use="required"/>
</xs:complexType>
<xs:complexType name="EmailAddressType">
  <xs:sequence>
    <xs:element type="xbpm:ParamType" name="AddressParam" minOccurs="0" />
  </xs:sequence>
  <xs:attribute name="Type" use="required">
    <xs:simpleType>
      <xs:restriction base="xs:string">
        <xs:enumeration value="FROM"/>
        <xs:enumeration value="TO"/>
        <xs:enumeration value="CC"/>
        <xs:enumeration value="BCC"/>
      </xs:restriction>
    </xs:simpleType>
  </xs:attribute>
</xs:complexType>
<xs:complexType name="EmailTemplateType">
  <xs:sequence>
    <xs:element type="xbpm:ParamType" name="TemplateParam" minOccurs="0"
maxOccurs="unbounded" />
  </xs:sequence>
  <xs:attribute name="Type" use="required">
    <xs:simpleType>
      <xs:restriction base="xs:string">
        <xs:enumeration value="SUBJECT"/>
        <xs:enumeration value="BODY"/>
      </xs:restriction>
    </xs:simpleType>
  </xs:attribute>
  <xs:attribute name="TemplateVariable" type="xs:string" use="required" />
</xs:complexType>
<xs:complexType name="StartStepType">
  <xs:sequence>
    <xs:element type="xs:string" name="Description" minOccurs="0"/>
    <xs:element type="xbpm:TransitionType" name="Transition" minOccurs="1" />
  </xs:sequence>
  <xs:attribute name="Name" type="xs:string" use="required"/>
</xs:complexType>
<xs:complexType name="SplitStepType">
  <xs:sequence>
    <xs:element type="xs:string" name="Description" minOccurs="0"/>
    <xs:element type="xbpm:TransitionType" name="Transition" minOccurs="1"
maxOccurs="unbounded"/>
  </xs:sequence>
<xs:attribute name="Name" type="xs:string" use="required"/>
</xs:complexType>
<xs:complexType name="OrStepType">
  <xs:sequence>
    <xs:element type="xs:string" name="Description" minOccurs="0"/>
    <xs:element type="xbpm:TransitionType" name="Transition" minOccurs="1" />
  </xs:sequence>
  <xs:attribute name="Name" type="xs:string" use="required"/>
</xs:complexType>
<xs:complexType name="AndStepType">
  <xs:sequence>
```

TABLE A-continued

Process Definition Schema

```
        <xs:element type="xs:string" name="Description" minOccurs="0"/>
        <xs:element type="xbpm:TransitionType" name="Transition" minOccurs="1"/>
      </xs:sequence>
      <xs:attribute name="Name" type="xs:string" use="required"/>
    </xs:complexType>
    <xs:complexType name="DecisionStepType">
      <xs:sequence>
        <xs:element type="xs:string" name="Description" minOccurs="0"/>
        <xs:element type="xbpm:TransitionRuleType" name="TransitionRule" minOccurs="1"
maxOccurs="unbounded"/>
      </xs:sequence>
      <xs:attribute name="Name" type="xs:string" use="required"/>
    </xs:complexType>
    <xs:complexType name="EventStepType">
      <xs:sequence>
        <xs:element type="xs:string" name="Description" minOccurs="0"/>
        <xs:element type="xbpm:EventBindingType" name="OnEvent" minOccurs="1" />
        <xs:element type="xbpm:StepTriggerType" name="Trigger" minOccurs="0" maxOccurs="5"/>
        <xs:element type="xbpm:TransitionType" name="Transition" minOccurs="1" />
        <xs:element type="xbpm:TimeoutActionType" name="TimeoutAction" minOccurs="0" />
      </xs:sequence>
      <xs:attribute name="Name" type="xs:string" use="required"/>
    </xs:complexType>
    <xs:complexType name="ExecutionStepType">
      <xs:sequence>
        <xs:element type="xs:string" name="Description" minOccurs="0"/>
        <xs:element type="xbpm:ActionRuleListType" name="ActionRules" minOccurs="0" />
        <xs:element type="xbpm:TransitionType" name="Transition" minOccurs="1" />
      </xs:sequence>
      <xs:attribute name="Name" type="xs:string" use="required"/>
    </xs:complexType>
    <xs:complexType name="PerformerStepType">
      <xs:sequence>
        <xs:element type="xs:string" name="Description" minOccurs="0"/>
        <xs:element type="xbpm:TransitionRuleType" name="TransitionRule" minOccurs="1" />
        <xs:element type="xbpm:ParamType" name="Performer" minOccurs="1" />
        <xs:element type="xbpm:StepTriggerType" name="Trigger" minOccurs="0" maxOccurs="5"/>
        <xs:element type="xbpm:IOVariableType" name="InputVariables" minOccurs="0"/>
        <xs:element type="xbpm:IOVariableType" name="OutputVariables" minOccurs="0"/>
        <xs:element type="xbpm:TimeoutActionType" name="TimeoutAction" minOccurs="0" />
      </xs:sequence>
      <xs:attribute name="Name" type="xs:string" use="required"/>
    </xs:complexType>
    <xs:complexType name="ContainerStepType">
      <xs:sequence>
        <xs:element type="xs:string" name="Description" minOccurs="0"/>
        <xs:element type="xbpm:TransitionType" name="Transition" />
        <xs:element type="xbpm:StartStepType" name="StartStep" minOccurs="1" />
        <xs:element type="xbpm:DoneStepType" name="DoneStep" minOccurs="1" />
        <xs:element type="xbpm:SplitStepType" name="SplitStep" minOccurs="0"
maxOccurs="unbounded"/>
        <xs:element type="xbpm:OrStepType" name="OrStep" minOccurs="0" maxOccurs="unbounded"/>
        <xs:elementtype="xbpm:AndStepType" name="AndStep" minOccurs="0" maxOccurs="unbounded"/>
        <xs:element type="xbpm:DecisionStepType" name="DecisionStep" minOccurs="0"
maxOccurs="unbounded"/>
        <xs:element type="xbpm:ExecutionStepType" name="ExecutionStep" minOccurs="0"
maxOccurs="unbounded"/>
        <xs:element type="xbpm:PerformerStepType" name="PerformerStep" minOccurs="0"
maxOccurs="unbounded"/>
        <xs:element type="xbpm:EventStepType" name="EventStep" minOccurs="0"
maxOccurs="unbounded"/>
        <xs:element type="xbpm:TimerStepType" name="TimerStep" minOccurs="0"
maxOccurs="unbounded"/>
        <xs:element type="xbpm:SubProcessStepType" name="SubProcessStep" minOccurs="0"
maxOccurs="unbounded"/>
        <xs:element type="xbpm:ServiceStepType" name="ServiceStep" minOccurs="0"
maxOccurs="unbounded"/>
        <xs:element type="xbpm:ContainerStepType" name="ContainerStep" minOccurs="0"
maxOccurs="unbounded"/>
      </xs:sequence>
      <xs:attribute name="Name" type="xs:string" use="required"/>
        <xs:attribute name="Type" use="required">
          <xs:simpleType>
            <xs:restriction base="xs:string">
              <xs:enumeration value="GROUP"/>
              <xs:enumeration value="LOOP"/>
            </xs:restriction>
          </xs:simpleType>
```

TABLE A-continued

Process Definition Schema

```
        </xs:attribute>
            <xs:attribute name="LoopExitRuleName" type="xs:string" />
    </xs:complexType>
    <xs:complexType name="SubProcessVariablesMapType"=>
        <xs:attribute name="From"type="xs:string" use="required"/>
        <xs:attribute name="To"type="xs:string" use="required"/>
    </xs:complexType>
    <xs:complexType name="SubProcessStepType" >
        <xs:sequence>
            <xs:element type="xs:string" name="Description" minOccurs="0"/>
            <xs:element type="xbpm:TransitionType" name="Transition" minOccurs="1" />
            <xs:element type="xbpm:SubProcessVariablesMapType" name="MapVariable" minOccurs="0"
maxOccurs="unbounded" />
        </xs:sequence>
        <xs:attribute name="Name" type="xs:string" use="required"/>
        <xs:attribute name="ProcessName" type="xs:string" use="required"/>
        <xs:attribute name="ProcessVersion" type="xs:string" use="required"/>
        <xs:attribute name="Type" use="required">
            <xs:simpleType>
                <xs:restriction base="xs:string">
                    <xs:enumeration value="DEPENDENT"/>
                    <xs:enumeration value="INDEPENDENT"/>
                </xs:restriction>
            </xs:simpleType>
        </xs:attribute>
    </xs:complexType>
    <xs:complexType name="ServiceStepType">
        <xs:sequence>
            <xs:element type="xs:string" name="Description" minOccurs="0"/>
                <xs:element type="xbpm:ServiceMethodParamType" name="MethodParam" minOccurs="0"
maxOccurs="unbounded" />
            <xs:element type="xbpm:TransitionType" name="Transition" minOccurs="1" />
        </xs:sequence>
        <xs:attribute name="Name" type="xs:string" use="required"/>
        <xs:attribute name="TargetNameSpace" type="xs:string" use="required"/>
        <xs:attribute name="TargetEndpointAddress"type="xs:string" use="required"/>
        <xs:attribute name="ServiceName" type="xs:string" use="required"/>
        <xs:attribute name="PortName" type="xs:string" use="required"/>
        <xs:attribute name="OperationName" type="xs:string" use="required"/>
        <xs:attribute name="ReturnTypeNameSpace" type="xs:string" use="required"/>
        <xs:attribute name="ReturnType" type="xs:string" use="required"/>
    </xs:complexType>
    <xs:complexType name="TimerStepType">
        <xs:sequence>
            <xs:element type="xs:string" name="Description" minOccurs="0"/>
            <xs:element type="xbpm:TimerExpressionType" name="TimerExpression" minOccurs="1" />
            <xs:element type="xbpm:TransitionType" name="Transition" minOccurs="1" />
            <xs:element type="xbpm:StepTriggerType" name="Trigger" minOccurs="0" maxOccurs="5"/>
        </xs:sequence>
        <xs:attribute name="Name" type="xs:string" use="required"/>
    </xs:complexType>
    <xs:complexType name="DoneStepType">
        <xs:sequence>
            <xs:element type="xs:string" name="Description" minOccurs="0"/>
        </xs:sequence>
        <xs:attribute name="Name" type="xs:string" use="required"/>
    </xs:complexType>
    <xs:complexType name="TransitionType" >
        <xs:attribute name="DestinationStepName" type="xs:string" use="required"/>
        <xs:attribute name="Type" use="required">
            <xs:simpleType>
                <xs:restriction base="xs:string">
                    <xs:enumeration value="START_STEP"/>
                    <xs:enumeration value="DONE_STEP"/>
                    <xs:enumeration value="OR_STEP"/>
                    <xs:enumeration value="AND_STEP"/>
                    <xs:enumeration value="SPLIT_STEP"/>
                    <xs:enumeration value="DECISION_STEP"/>
                    <xs:enumeration value="EVENT_STEP"/>
                    <xs:enumeration value="EXECUTION_STEP"/>
                    <xs:enumeration value="PERFORMER_STEP"/>
                    <xs:enumeration value="CONTAINER_STEP"/>
                    <xs:enumeration value="SUBPROCESS_STEP"/>
                    <xs:enumeration value="TIMER_STEP"/>
                    <xs:enumeration value="SERVICE_STEP"/>
                </xs:restriction>
            </xs:simpleType>
        </xs:attribute>
```

TABLE A-continued

| Process Definition Schema |
| --- |

```
    </xs:complexType>
    <xs:complexType name="TransitionRuleType">
        <xs:sequence>
            <xs:element type="xs:string" name="Description" minOccurs="0"/>
            <xs:element type="xbpm:TransitionType" name="Transition" minOccurs="1" />
        </xs:sequence>
      <xs:attribute name="RuleName" type="xs:string" use="required"/>
    </xs:complexType>
</xs:schema>
```

TABLE B

| Service API |
| --- |

```
    /**
    * Loads A Process Definition to the XBPM Repositiory
    * Returns a XBPMProcessLoaderResponse Object
    * @param pxml Process Definition to be saved in XBPM Repository
    * @param replace - true replaces an existing Process Definition
    * @return XBPMProcessLoaderResponse
    * @throws RemoteException
    */
    public XBPMProcessLoaderResponse loadProcessDefinition(String pxml,boolean replace)
throws RemoteException;
    /**
    * Validates A Process Definition
    * Returns a XBPMProcessLoaderResponse Object
    * @param pxml Process Definition to be saved in XBPM Repository
    * @return XBPMProcessLoaderResponse
    * @throws RemoteException
    */
    public XBPMProcessLoaderResponse validateProcessDefinition(String pxml) throws
RemoteException;
    /**
    * Deletes A Process Definition to the XBPM Repositiory
    * Returns a XBPMProcessLoaderResponse Object
    * @param processName Name of the Process
    * @param processVersion Version of the Process
    * @return XBPMProcessLoaderResponse
    * @throws RemoteException
    */
    public XBPMProcessLoaderResponse deleteProcessDefinition(String processName,String
processVersion) throws RemoteException;
    /**
    * Starts a Process Instance
    * Returns a XBPMRuntimeResponse Object
    * @param processName Name of the Process
    * @param processVersion Version of the Process
    * @param initParams Contains initial variable values, initiator id
    * @return XBPMRuntimeResponse
    * @throws RemoteException
    */
    public XBPMRuntimeResponse startProcessInstance(String processName,String
processVersion,CreateInstanceParam initParams) throws RemoteException;
    /**
    * Consumes an event. All ProcessInstance Event Steps waiting on an event is triggered by this
call.
    * Returns a XBPMRuntimeResponse Object
    * @param processName Name of the Process
    * @param processVersion Version of the Process
    * @param Event Name - The event to be consumed
    * @param Event Properties - Properties to be copied to the appropriate process variables
    * @return XBPMRuntimeResponse
    * @throws RemoteException
    */
    public XBPMRuntimeResponse consumeEvent(String processName,String
processVersion,String eventName,NameValueList eventProperties) throws RemoteException;
    /**
    * Applies Work. The performer applies work on a specific performer step instance
    * Returns a XBPMRuntimeResponse Object
    * @param instanceId Id of the Process Instance
    * @param workItemId Id of the Work Item
    * @param performerStepName Performer Step Name for which the work was applied
    * @param performer - The Performer who applied the work
    * @param appliedWorkProperties - Properties to be copied to the appropriate process variables
```

TABLE B-continued

Service API

```
     * @return XBPMRuntimeResponse
     * @throws RemoteException
     */
     public XBPMRuntimeResponse applyWork(long instanceId,long workItemId,String
performerStepName,String performer,NameValueList appliedWorkProperties) throws RemoteException;
     /**
     * Cancels Work. The performer cancels work on a specific performer step instance
     * Returns a XBPMRuntimeResponse Object
     * @param instanceId Id of the Process Instance
     * @param workItemId Id of the Work Item
     * @param performerStepName Performer Step Name for which the work was applied
     * @param performer - The Performer who cancels the work
     * @return XBPMRuntimeResponse
     * @throws RemoteException
     */
     public XBPMRuntimeResponse cancelWork(long instanceId,long workItemId,String
performerStepName,String performer) throws RemoteException;
     /**
     * Cancels Work. The performer reassigns his work to a new performer on a specific performer
step instance
     * Returns a XBPMRuntimeResponse Object
     * @param instanceId Id of the Process Instance
     * @param workItemId Id of the Work Item
     * @param performerStepName Performer Step Name for which the work was applied
     * @param performer - The Performer whose work is reassigned
   * @param newPerformer - The Performer who is reassigned
     * @return XBPMRuntimeResponse
     * @throws RemoteException
     */
     public XBPMRuntimeResponse reassignWork(long instanceId,long workItemId,String
performerStepName,String performer,String newPerformer) throws RemoteException;
     /**
     * Gets pending work items for a performer.
     * Returns a XBPMWorkItemQueryResponse Object
     * @param performer - The Performer who is assigned the work
     * @return XBPMWorkItemQueryResponse
     * @throws RemoteException
     */
     public XBPMWorkItemQueryResponse getInbox(String performer) throws RemoteException;
     /**
     * Gets applied work items for a performer.
     * Returns a XBPMWorkItemQueryResponse Object
     * @param performer - The Performer who applied the work
     * @return XBPMWorkItemQueryResponse
     * @throws RemoteException
     */
     public XBPMWorkItemQueryResponse getOutbox(String performer) throws RemoteException;
     /**
     * Queries for process flows.
     * Returns a XBPMProcessFlowQueryResponse Object
     * @param ProcessFlowWSO. The name,version and author fields are used as criteria
     * @return XBPMProcessFlowQueryResponse
     * @throws RemoteException
     */
     public XBPMProcessFlowQueryResponse queryProcessFlow(ProcessFlowWSO pflow,int
stIndex) throws RemoteException;
     /**
     * Queries for process instances.
     * Returns a XBPMProcessInstanceQueryResponse Object
     * @param ProcessInstanceWSO. The processName,processVersion,initiator and instanceState
fields are used as criteria
     * @return XBPMProcessFlowQueryResponse
     * @throws RemoteException
     */
     public XBPMProcessInstanceQueryResponse queryProcessInstance(ProcessInstanceWSO
pinstance,int stIndex) throws RemoteException;
     /**
     * Suspends a process. In this state all events are ignored including timeouts.
     * Returns a XBPMRuntimeResponse Object
     * @param processInstance Instance ID of the Process
     * @return XBPMRuntimeResponse
     * @throws RemoteException
     */
     public XBPMRuntimeResponse suspendProcess(long instanceId) throws RemoteException;
     /**
     * Resumes a suspended process.
     * Returns a XBPMRuntimeResponse Object
     * @param processInstance Instance ID of the Process
```

TABLE B-continued

Service API

```
    * @return XBPMRuntimeResponse
    * @throws RemoteException
    */
    public XBPMRuntimeResponse resumeProcess(long instanceId) throws RemoteException;
    /**
    * Terminates a process. In this state all events are ignored including timeouts.
    * Returns a XBPMRuntimeResponse Object
    * @param processInstance Instance ID of the Process
    * @return XBPMRuntimeResponse
    * @throws RemoteException
    */
    public XBPMRuntimeResponse terminateProcess(long instanceId) throws RemoteException;
    /**
    * Suspends a Step. In this state all events are ignored including timeouts.
    * Applicable only to Event,Performer and Timer Steps
    * Returns a XBPMRuntimeResponse Object
    * @param processInstance Instance ID of the Process
    * @param stepName Step Name
    * @return XBPMRuntimeResponse
    * @throws RemoteException
    */
    public XBPMRuntimeResponse suspendStep(long instanceId,String stepName) throws
RemoteException;
    /**
    * Resumes a suspended step.
    * Returns a XBPMRuntimeResponse Object
    * @param processInstance Instance ID of the Process
    * @param stepName Step Name
    * @return XBPMRuntimeResponse
    * @throws RemoteException
    */
    public XBPMRuntimeResponse resumeStep(long instanceId,String stepName) throws
RemoteException;
```

TABLE C

Sample Process Definition

```
<ProcessFlow Name="XactlyDocApproval" Version="2" Author="Vasu" State="Transient"
xmlns="http://xbpm.xactly.com/schema">
    <Description><![CDATA[Xactly Document Approval Process]]></Description>
  <Variables>
    <Variable Name="currentPerformer" DataType="STRING" VariableType="GLOBAL">
      <Description><![CDATA[Current Performer Variable]]></Description>
      <Value></Value>
    </Variable>
    <Variable Name="actionType" DataType="STRING" VariableType="GLOBAL">
      <Description><![CDATA[Action Type Variable]]></Description>
      <Value></Value>
    </Variable>
    <Variable Name="timer" DataType="OBJECT" VariableType="GLOBAL">
      <Description><![CDATA[TimerVariable]]></Description>
      <ObjectType>java.util.Calendar</ObjectType>
    </Variable>
    <Variable Name="reminder" DataType="OBJECT" VariableType="GLOBAL">
      <Description><![CDATA[Reminder Variable]]></Description>
      <ObjectType>java.util.Calendar</ObjectType>
    </Variable>
    <Variable Name="reminder2" DataType="OBJECT" VariableType="GLOBAL">
      <Description><![CDATA[2 Reminder Variable]]></Description>
      <ObjectType>java. util.Calendar</ObjectType>
    </Variable>
    <Variable Name="reminderPastDueDate" DataType="OBJECT" VariableType="GLOBAL">
      <Description><![CDATA[Past Due Date Variable]]></Description>
      <ObjectType>java. util.Calendar</ObjectType>
    </Variable>
    <Variable Name="pastDueRecurringType" DataType="STRING" VariableType="GLOBAL">
      <Description><![CDATA[Reminder Recurring Type Variable]]></Description>
      <Value>NONE</Value>
    </Variable>
    <VariableName="pastDueNumReminders" DataType="INTEGER" VariableType="GLOBAL">
      <Description><![CDATA[Reminder Past Due Max Reminders Type Variable]]></Description>
      <Value>0</Value>
    </Variable>
    <Variable Name="processMap" DataType="OBJECT" VariableType="GLOBAL">
```

TABLE C-continued

Sample Process Definition

```
      <Description><![CDATA[Process Information]]></Description>
      <ObjectType>java. util. HashMap</ObjectType>
    </Variable>
    <Variable Name="dummyResult" DataType="OBJECT" VariableType="GLOBAL">
      <Description><![CDATA[Dummy Boolean Variable]]></Description>
      <ObjectType>java.lang.Boolean</ObjectType>
    </Variable>
  </Variables>
  <Methods>
    <Method Name="InitializeProcessMap"
ClassName="com.xactly.xbpm.services.approval.lib.XactlyDocApprovalServices"
MethodName="initializeProcessMap" >
      <MethodParam Type="VARIABLE">
        <Value>processMap</Value>
      </MethodParam>
    </Method>
    <Method Name="AssignPerformer"
ClassName="com.xactly.xbpm.services.approval.lib.XactlyDocApprovalServices"
MethodName="assignPerformer">
      <MethodParam Type="VARIABLE">
        <Value>processMap</Value>
      </MethodParam>
    </Method>
    <Method Name="ResetTimer"
ClassName="com.xactly.xbpm.services.approval.lib.XactlyDocApprovalServices"
MethodName="resetTimer">
      <MethodParam Type="VARIABLE">
        <Value>processMap</Value>
      </MethodParam>
    </Method>
    <Method Name="ResetReminder"
ClassName="com.xactly.xbpm.services.approval.lib.XactlyDocApprovalServices"
MethodName="resetReminder">
      <MethodParam Type="VARIABLE">
        <Value>processMap</Value>
      </MethodParam>
    </Method>
    <Method Name="ResetReminder2"
ClassName="com.xactly.xbpm.services.approval.lib.XactlyDocApprovalServices"
MethodName="resetReminder2">
      <MethodParam Type="VARIABLE">
        <Value>processMap</Value>
      </MethodParam>
    </Method>
    <Method Name="ResetReminderPastDueDate"
ClassName="com.xactly.xbpm.services.approval.lib.XactlyDocApprovalServices"
MethodName="resetReminderPastDueDate">
      <MethodParam Type="VARIABLE">
        <Value>processMap</Value>
      </MethodParam>
    </Method>
    <Method Name="AssignActionType"
ClassName="com.xactly.xbpm.services.approval.lib.XactlyDocApprovalServices"
MethodName="assignActionType">
      <MethodParam Type="VARIABLE">
        <Value>processMap</Value>
      </MethodParam>
    </Method>
    <Method Name="ApprovalContainerExitMethod"
ClassName="com.xactly.xbpm.services.approval.lib.XactlyDocApprovalServices"
MethodName="exitApprovalContainer">
      <MethodParam Type="VARIABLE">
        <Value>processMap</Value>
      </MethodParam>
    </Method>
    <Method Name="PostApproval"
ClassName="com.xactly.xbpm.services.approval.lib.XactlyDocApprovalServices"
MethodName="postApproval">
      <MethodParam Type="VARIABLE">
        <Value>processMap</Value>
      </MethodParam>
    </Method>
    <Method Name="PostPerformerAction"
ClassName="com.xactly.xbpm.services.approval.lib.XactlyDocApprovalServices"
MethodName="postPerformerAction">
      <MethodParam Type="VARIABLE">
        <Value>processMap</Value>
      </MethodParam>
```

TABLE C-continued

Sample Process Definition

```
        </Method>
        <Method Name=“PrePerformerAction”
ClassName=“com.xactly.xbpm.services.approval.lib.XactlyDocApprovalServices”
MethodName=“prePerformerActionv2”>
            <MethodParam Type=“VARIABLE”>
                <Value>processMap</Value>
            </MethodParam>
        </Method>
        <Method Name=“HandlePreActionErrors”
ClassName=“com.xactly.xbpm.services.approval.lib.XactlyDocApprovalServices”
MethodName=“handlePreActionErrors”>
            <MethodParam Type=“VARIABLE”>
                <Value>processMap</Value>
            </MethodParam>
        </Method>
        <Method Name=“OnPreActionErrors”
ClassName=“com.xactly.xbpm.services.approval.lib.XactlyDocApprovalServices”
MethodName=“onPreActionErrors”>
            <MethodParam Type=“VARIABLE”>
                <Value>processMap</Value>
            </MethodParam>
        </Method>
        <Method Name=“OnNoPreActionErrors”
ClassName=“com.xactly.xbpm.services.approval.lib.XactlyDocApprovalServices”
MethodName=“onNoPreActionErrors”>
            <MethodParam Type=“VARIABLE”>
                <Value>processMap</Value>
            </MethodParam>
        </Method>
        <Method Name=“ReminderEmail”
ClassName=“com.xactly.xbpm.services.approval.lib.XactlyDocApprovalServices”
MethodName=“reminderEmail”>
            <MethodParam Type=“VARIABLE”>
                <Value>processMap</Value>
            </MethodParam>
        </Method>
        <Method Name=“AtomicTransactionCompleteCallback”
ClassName=“com.xactly.xbpm.services.approval.lib.XactlyDocApprovalServices”
MethodName=“txnCompleteCbk”>
            <MethodParam Type=“VARIABLE”>
                <Value>XBPM_RESERVED_INSTANCE_WSO</Value>
            </MethodParam>
        </Method>
        <Method Name=“AtomicTransactionRollbackCallback”
ClassName=“com.xactly.xbpm.services.approval.lib.XactlyDocApprovalServices”
MethodName=“txnRollbackCbk”>
            <MethodParam Type=“VARIABLE”>
                <Value>XBPM_RESERVED_INSTANCE_WSO</Value>
            </MethodParam>
        </Method>
    </Methods>
    <Rules>
        <Rule>
            <ExpressionRule Name=“DefaultRule”>
                <Expression>(1 == 1)</Expression>
            </ExpressionRule>
        </Rule>
        <Rule>
            <MethodRule Name=“ApprovalContainerExitRule”>
                <MethodCall>ApprovalContainerExitMethod</MethodCall>
            </MethodRule>
        </Rule>
        <Rule>
            <MethodRule Name=“OnPreActionErrors”>
                <MethodCall>OnPreActionErrors</MethodCall>
            </MethodRule>
        </Rule>
        <Rule>
            <MethodRule Name=“OnNoPreActionErrors”>
                <MethodCall>OnNoPreActionErrors</MethodCall>
            </MethodRule>
        </Rule>
    </Rules>
    <StartStep Name=“StartApproval”>
        <Transition DestinationStepName=“Initialize”Type=“EXECUTION_STEP” />
    </StartStep>
    <DoneStep Name=“DoneApproval”>
    </DoneStep>
```

TABLE C-continued

Sample Process Definition

```
  <ExecutionStep Name=“Initialize”>
        <ActionRules>
          <ActionRule RuleName=“DefaultRule”>
            <MethodAction ToVariable=“processMap” MethodName=“InitializeProcessMap” />
          </ActionRule>
        </ActionRules>
        <Transition DestinationStepName=“ApprovalContainer” Type=“CONTAINER_STEP” />
  </ExecutionStep>
  <ExecutionStep Name=“PostApproval”>
        <ActionRules>
          <ActionRule RuleName=“DefaultRule”>
            <MethodAction ToVariable=“dummyResult” MethodName=“PostApproval” />
          </ActionRule>
        </ActionRules>
        <Transition DestinationStepName=“DoneApproval” Type=“DONE_STEP” />
  </ExecutionStep>
  <ContainerStep Name=“ApprovalContainer”Type=“LOOP”
LoopExitRuleName=“ApprovalContainerExitRule”>
      <Transition DestinationStepName=“PostApproval” Type=“EXECUTION_STEP” />
      <StartStep Name=“StartApprovalContainer”>
        <Transition DestinationStepName=“PreAction” Type=“EXECUTION_STEP” />
      </StartStep>
      <DoneStep Name=“DoneApprovalContainer” />
      <OrStep Name=“ProceedToPostAction”>
        <Transition DestinationStepName=“PostAction” Type=“EXECUTION_STEP” />
      </OrStep>
      <DecisionStep Name=“DecidePerformerAction”>
        <TransitionRule RuleName=“OnPreActionErrors”>
          <Transition DestinationStepName=“PreActionErrorNotification” Type=“EXECUTION_STEP”
/>
        </TransitionRule>
        <TransitionRule RuleName=“OnNoPreActionErrors”>
          <Transition DestinationStepName=“PerformerAction”Type=“PERFORMER_STEP” />
        </TransitionRule>
      </DecisionStep>
      <ExecutionStep Name=“PreAction”>
        <ActionRules>
          <ActionRule RuleName=“DefaultRule”>
            <MethodAction ToVariable=“processMap” MethodName=“PrePerformerAction” />
            <MethodAction ToVariable=“currentPerformer” MethodName=“AssignPerformer” />
              <MethodAction ToVariable=“timer” MethodName=“ResetTimer”/>
              <MethodAction ToVariable=“reminder” MethodName=“ResetReminder”/>
              <MethodAction ToVariable=“reminder2” MethodName=“ResetReminder2”/>
              <MethodAction ToVariable=“reminderPastDueDate”
MethodName=“ResetReminderPastDueDate”/>
            <MethodAction ToVariable=“actionType” MethodName=“AssignActionType”/>
        </ActionRule>
      </ActionRules>
      <Transition DestinationStepName=“DecidePerformerAction” Type=“DECISION_STEP” />
  </ExecutionStep>
  <ExecutionStep Name=“PostAction”>
        <ActionRules>
          <ActionRule RuleName=“DefaultRule”>
            <MethodAction ToVariable=“processMap” MethodName=“PostPerformerAction” />
          </ActionRule>
        </ActionRules>
      <Transition DestinationStepName=“DoneApprovalContainer” Type=“DONE_STEP” />
  </ExecutionStep>
  <ExecutionStep Name=“PreActionErrorNotification”>
      <ActionRules>
        <ActionRule RuleName=“DefaultRule”>
          <MethodAction ToVariable=“dummyResult” MethodName=“HandlePreActionErrors” />
        </ActionRule>
      </ActionRules>
      <Transition DestinationStepName=“ProceedToPostAction” Type=“OR_STEP” />
  </ExecutionStep>
  <PerformerStep Name=“PerformerAction”Type=“VARIABLE” VariableName=“actionType”>
      <TransitionRule RuleName=“DefaultRule”>
        <Transition DestinationStepName=“ProceedToPostAction” Type=“OR_STEP” />
      </TransitionRule>
      <Performer Type=“VARIABLE”>
        <Value>currentPerformer</Value>
      </Performer>
      <InputVariables>
        <VariableName>processMap</VariableName>
      </InputVariables>
      <OutputVariables>
        <VariableName>processMap</VariableName>
```

TABLE C-continued

Sample Process Definition

```
    </OutputVariables>
    <TimeoutAction Action="Continue">
      <TimerExpression Type="VARIABLE">
        <Value>timer</Value>
      </TimerExpression>
    </TimeoutAction>
  <Reminders>
    <Reminder>
      <TimerExpression Type="VARIABLE">
        <Value>reminder</Value>
      </TimerExpression>
      <ActionRules>
        <ActionRule RuleName="DefaultRule">
          <MethodAction ToVariable="dummyResult" MethodName="ReminderEmail"/>
        </ActionRule>
      </ActionRules>
    </Reminder>
    <Reminder>
        <TimerExpression Type="VARIABLE">
          <Value>reminder2</Value>
        </TimerExpression>
      <ActionRules>
        <ActionRule RuleName="DefaultRule">
          <MethodAction ToVariable="dummyResult" MethodName="ReminderEmail" />
        </ActionRule>
      </ActionRules>
    </Reminder>
    <Reminder>
        <TimerExpression Type="VARIABLE">
          <Value>reminderPastDueDate</Value>
        </TimerExpression>
        <TimerRepeatInterval>
          <MaxRepeatVariable>pastDueNumReminders</MaxRepeatVariable>
          <RecurringTypeVariable>pastDueRecurringType</RecurringTypeVariable>
        </TimerRepeatInterval>
      <ActionRules>
        <ActionRule RuleName="DefaultRule">
          <MethodAction ToVariable="dummyResult" MethodName="ReminderEmail" />
        </ActionRule>
      </ActionRules>
    </Reminder>
  </Reminders>
</PerformerStep>
</ContainerStep>
<FailAction Action="Terminate" />
<AtomicTransactionCompleteAction>
    <MethodCall>AtomicTransactionCompleteCallback</MethodCall>
</AtomicTransactionCompleteAction>
<AtomicTransactionRollbackAction>
    <MethodCall>AtomicTransactionRollbackCallback</MethodCall>
</AtomicTransactionRollbackAction>
</ProcessFlow>
```

What is claimed is:

1. A data processing method comprising computer-implemented steps of:

using a process management computer, receiving an electronic workflow document in response to execution of editing instructions at a user terminal that is coupled by network to the process management computer, wherein the electronic workflow document defines a workflow using a plurality of tags and statements that specify steps in the workflow, wherein each of the steps is either an atomic type step or a non-atomic type step, wherein at least a first step that is atomic comprises a plurality of instructions and is programmed to signal, to a second and successive non-atomic step, normal completion of execution of the first step; wherein at least a second step that is non-atomic is programmed to call a completion callback in response to the signal, wherein the workflow specified in the electronic workflow document comprises a plurality of steps for reviewing and approving an electronic text document, a sales quota, or an incentive compensation plan;

using the process management computer, parsing the electronic workflow document to form an in-memory representation of the workflow in computer memory;

using the process management computer and using the in-memory representation, executing the first step, transitioning to the second step and executing a first portion of the instructions that are programmed in the second step while the first step is executing, wherein one or more error processing steps are performed on the first portion of the instructions if the first step encounters an error;

using the process management computer, receiving a call to the completion callback from the second step in response to normal completion of execution of the first step; and using the process management computer, only after receiving the call to the completion callback from the second step, continuing execution of a second portion of the instructions that are programmed in the second step, wherein the method is performed by one or more special-purpose computing devices.

2. The data processing method of claim 1 wherein the first step comprises an execution step.

3. The data processing method of claim 1 wherein the first step comprises a decision step.

4. The data processing method of claim 1 wherein the first step comprises a timer step.

5. The data processing method of claim 1 wherein the second step comprises a performer step.

6. The data processing method of claim 1 wherein the second step comprises a service step.

7. A data processing method comprising computer-implemented steps of:

using a process management computer, receiving an electronic workflow document in response to editing instructions executed at a user terminal that is coupled by network to the process management computer, wherein the electronic workflow document defines a workflow using a plurality of tags and statements that specify steps in the workflow, wherein each of the steps is either an atomic type step or a non-atomic type step, wherein at least a first step that is atomic comprises a plurality of instructions and is programmed to signal, to a second and successive step that is non-atomic, an error signal in response to occurrence of an error during execution of the first step wherein at least the second step that is non-atomic is programmed to call an error callback in response to the error signal, wherein the workflow specified in the electronic workflow document comprises a plurality of steps for reviewing and approving an electronic text document, a sales quota, or an incentive compensation plan;

using the process management computer, parsing the electronic workflow document to form an in-memory representation of the workflow in computer memory;

using the process management computer and using the in-memory representation, executing the first step, transitioning to the second step and executing a first portion of the instructions that are programmed in the second step while the first step is executing;

using the process management computer, invoking the error callback in response to the error signal of the first step in response to an error during execution of the first step; and using the process management computer, only after receiving the error signal from the first step, performing one or more error processing steps on the first portion of the second step and continuing execution of a second portion of the instructions that are programmed in the second step, wherein the method is performed by one or more special-purpose computing devices.

8. The data processing method of claim 7 wherein the error processing steps in the second step comprise any of rollback of a database, generating and communicating a notification message to the user terminal, updating a state variable in the computer memory.

9. The data processing method of claim 7 wherein the first step comprises an execution step.

10. The data processing method of claim 7 wherein the first step comprises a decision step.

11. The data processing method of claim 7 wherein the first step comprises a timer step.

12. The data processing method of claim 7 wherein the second step comprises a performer step.

13. The data processing method of claim 7 wherein the second step comprises a service step.

14. The data processing method of claim 7, further comprising, using the process management computer, calling back to an application program in response to invoking the error callback and providing signaling to the application program to perform error correction.

15. A computer system comprising:

a process management computer coupled to an application module that implements an application program, to a first database configured as a process management datastore and a second database configured as an application data repository;

a user terminal that is coupled by network to the process management computer;

wherein the process management computer comprises a process management engine that is coupled to a plurality of method libraries and is programmed to perform:

using the process management computer, receiving an electronic workflow document in response to execution of editing instructions at the user terminal, wherein the electronic workflow document defines a workflow using a plurality of tags and statements that specify steps in the workflow, wherein each of the steps is either an atomic type step or a non-atomic type step, wherein at least a first step that is atomic comprises a plurality of instructions and is programmed to signal, to a second and successive non-atomic step, normal completion of execution of the first step, wherein at least a second step that is non-atomic is programmed to call a completion callback in response to the signal, wherein the workflow specified in the electronic workflow document comprises a plurality of steps for reviewing and approving an electronic text document, a sales quota, or an incentive compensation plan;

using the process management computer, parsing the electronic workflow document to form an in-memory representation of the workflow in computer memory;

using the process management computer and using the in-memory representation, executing the first step, transitioning to the second step and executing a first portion of the instructions that are programmed in the second step while the first step is executing, wherein one or more error processing steps are performed on the first portion of the instructions if the first step encounters an error;

using the process management computer, receiving a call to the completion callback from the second step in response to normal completion of execution of the first step; and using the process management computer, only after receiving the call to the completion callback from the second step, continuing execution of a second portion of the instructions that are programmed in the second step.

16. The computer system of claim 15 wherein the first step comprises an execution step or a decision step.

17. The computer system of claim 15 wherein the second step comprises a performer step or a service step.

18. A computer system comprising:

a process management computer coupled to an application module that implements an application program, to a first database configured as a process management datastore and a second database configured as an application data repository;

a user terminal that is coupled by network to the process management computer;

wherein the process management computer comprises a process management engine that is coupled to a plurality of method libraries and is programmed to perform:

using a process management computer, receiving an electronic workflow document in response to editing instructions executed at a user terminal that is coupled by network to the process management computer, wherein the electronic workflow document defines a workflow using a plurality of tags and statements that specify steps in the workflow, wherein each of the steps is either an atomic type step or a non-atomic type step, wherein at least a first step that is atomic comprises a plurality of instructions and is programmed to signal, to a second and successive step that is non-atomic, an error signal in response to occurrence of an error during execution of the first step wherein at least the second step that is non-atomic is programmed to call an error callback in response to the error signal, wherein the workflow specified in the electronic workflow document comprises a plurality of steps for reviewing and approving an electronic text document, a sales quota, or an incentive compensation plan;

using the process management computer, parsing the electronic workflow document to form an in-memory representation of the workflow in computer memory;

using the process management computer and using the in-memory representation, executing the first step, transitioning to the second step and executing a first portion of the instructions that are programmed in the second step while the first step is executing;

using the process management computer, invoking the error callback in response to the error signal of the first step in response to an error during execution of the first step; and using the process management computer, only after receiving the error signal from the first step, performing one or more error processing steps on the first portion of the second step and continuing execution of a second portion of the instructions that are programmed in the second step.

19. The computer system of claim 18 wherein the error processing steps in the second step comprise any of rollback of a database, generating and communicating a notification message to the user terminal, updating a state variable in the computer memory.

20. The computer system of claim 18 wherein the first step comprises an execution step, decision step or timer step; wherein the second step comprises a performer step or service step.

21. The computer system of claim 18, further comprising, using the process management computer, calling back to an application program in response to invoking the error callback and providing signaling to the application program to perform error correction.

* * * * *